(12) United States Patent
Hongo

(10) Patent No.: US 11,955,850 B2
(45) Date of Patent: Apr. 9, 2024

(54) COLD PRESSURE WELDING APPARATUS, COIL MANUFACTURING APPARATUS, COIL, AND METHOD OF MANUFACTURING THE SAME

(71) Applicant: ASTER CO., LTD., Yokote (JP)

(72) Inventor: Takenobu Hongo, Fukushima (JP)

(73) Assignee: Aster Co., Ltd., Yokote (JP)

( * ) Notice: Subject to any disclaimer, the term of this patent is extended or adjusted under 35 U.S.C. 154(b) by 0 days.

(21) Appl. No.: 17/810,183

(22) Filed: Jun. 30, 2022

(65) Prior Publication Data
US 2022/0352792 A1 Nov. 3, 2022

Related U.S. Application Data

(60) Continuation of application No. 16/864,953, filed on May 1, 2020, which is a division of application No.
(Continued)

(30) Foreign Application Priority Data

Dec. 18, 2013 (JP) .................................. 2013-261581
Dec. 15, 2014 (JP) .................................. 2014-252885

(51) Int. Cl.
B23K 20/00 (2006.01)
B23K 20/02 (2006.01)
(Continued)

(52) U.S. Cl.
CPC ......... H02K 15/0068 (2013.01); B23K 20/02 (2013.01); B23K 20/028 (2013.01);
(Continued)

(58) Field of Classification Search
CPC .......... H02K 15/0068; H02K 15/0414; B23K 20/00–04; B23K 20/028; B23K 2101/38; H01F 41/061; H01F 27/2847
(Continued)

(56) References Cited

U.S. PATENT DOCUMENTS 2,751,724 A 6/1956 Polzer
2,779,954 A 2/1957 Barnes
(Continued)

FOREIGN PATENT DOCUMENTS

CN 1140355 A 1/1997
CN 1871673 A 11/2006
(Continued)

OTHER PUBLICATIONS

Anonymous. (Feb. 20, 2012) "Magnet wire—Wikipedia, the free encyclopedia," located at https://web.archive.org/web/20120220001756/ https://en.wikipedia.org/wiki/Magnet_wire visited on Nov. 11, 2017. (1 page).

(Continued)

*Primary Examiner* — Kiley S Stoner
(74) *Attorney, Agent, or Firm* — MORRISON & FOERSTER LLP

(57) ABSTRACT

The cold pressure welding apparatus includes a first holding part capable of sandwiching a first flat conductor, a second holding part disposed opposite to the first holding part and capable of sandwiching a second flat conductor, and a drive part for moving the first holding part and the second holding part. The drive part can move the first holding part and the second holding part between a first direction separated position and a close position along a first direction. The drive part can move the first holding part and the second holding part between a second direction separated position and a sandwiching position along a second direction.

3 Claims, 17 Drawing Sheets

Related U.S. Application Data

16/116,188, filed on Aug. 29, 2018, now Pat. No. 10,742,097, which is a division of application No. 15/105,485, filed as application No. PCT/JP2014/083556 on Dec. 18, 2014, now Pat. No. 10,211,710.

(51) Int. Cl.
| | |
|---|---|
| *H01F 41/061* | (2016.01) |
| *H02K 15/00* | (2006.01) |
| *B23K 101/38* | (2006.01) |
| *H01F 27/28* | (2006.01) |

(52) U.S. Cl.
CPC ........ *H01F 41/061* (2016.01); *B23K 2101/38* (2018.08); *H01F 27/2847* (2013.01)

(58) Field of Classification Search
USPC .................................................. 228/6.1–6.2
See application file for complete search history.

(56) References Cited

U.S. PATENT DOCUMENTS

| | | | |
|---|---|---|---|
| 3,376,635 A | | 4/1968 | Moesker |
| 3,495,327 A | | 2/1970 | Eisler |
| 3,768,718 A | | 10/1973 | Rozmus et al. |
| 3,992,818 A | | 11/1976 | Clausen |
| 4,029,252 A | | 6/1977 | Hawkins |
| 4,073,425 A | | 2/1978 | Bollian |
| 4,078,712 A | | 3/1978 | Cook et al. |
| 4,094,453 A | | 6/1978 | Cook et al. |
| 4,377,732 A | | 3/1983 | Preller |
| 4,694,283 A | | 9/1987 | Reeb |
| 4,782,992 A | | 11/1988 | Doble |
| 5,147,085 A | | 9/1992 | Hawkes et al. |
| 5,184,769 A | | 2/1993 | Moracz et al. |
| 5,234,154 A | | 8/1993 | Kajiwara et al. |
| 5,359,815 A | | 11/1994 | Schrunk, III et al. |
| 5,771,563 A | | 6/1998 | Meier et al. |
| 6,098,866 A | * | 8/2000 | Tsuchiya ............ B23K 37/0533 269/239 |
| 6,198,375 B1 | | 3/2001 | Shafer |
| 7,735,706 B2 | | 6/2010 | Sohl et al. |
| 7,748,595 B2 | * | 7/2010 | Jin .................. B23K 20/24 228/173.6 |
| 8,011,556 B2 | * | 9/2011 | Behrens ............ B21B 15/0085 228/5.7 |
| 8,413,314 B2 | | 4/2013 | Nakamura |
| 8,584,923 B2 | * | 11/2013 | Lee .................. B23K 20/02 228/115 |
| 8,618,902 B2 | | 12/2013 | Nogi et al. |
| 8,850,862 B2 | | 10/2014 | Akimoto et al. |
| 9,496,773 B2 | | 11/2016 | Ishigami et al. |
| 9,579,747 B2 | * | 2/2017 | Jin .................. B23K 20/028 |
| 2001/0017312 A1 | | 8/2001 | Horii et al. |
| 2003/0042294 A1 | | 3/2003 | Matsumoto et al. |
| 2005/0108870 A1 | | 5/2005 | Harada et al. |
| 2005/0168096 A1 | | 8/2005 | Joho |
| 2006/0108678 A1 | | 5/2006 | Kumar et al. |
| 2007/0188287 A1 | | 8/2007 | Lien et al. |
| 2008/0190992 A1 | | 8/2008 | Jin |
| 2009/0084828 A1 | | 4/2009 | Sohl et al. |
| 2010/0026133 A1 | | 2/2010 | Fubuki et al. |
| 2011/0036901 A1 | * | 2/2011 | Behrens ............ B21B 15/0085 228/13 |
| 2011/0095072 A1 | | 4/2011 | Fujimura et al. |
| 2012/0315082 A1 | | 12/2012 | Linzell |
| 2013/0162072 A1 | | 6/2013 | Mizutani et al. |
| 2013/0214888 A1 | | 8/2013 | Nogi et al. |
| 2013/0257575 A1 | | 10/2013 | Timashov et al. |
| 2014/0167899 A1 | | 6/2014 | Dien |
| 2014/0265711 A1 | | 9/2014 | Koshino et al. |
| 2014/0345155 A1 | | 11/2014 | Contarini et al. |
| 2015/0060530 A1 | | 3/2015 | Jin |
| 2015/0221430 A1 | | 8/2015 | Wu Li |
| 2018/0091028 A1 | | 3/2018 | Estrada et al. |

FOREIGN PATENT DOCUMENTS

| | | | | |
|---|---|---|---|---|
| CN | 101572161 A | | 11/2009 | |
| CN | 101584103 A | | 11/2009 | |
| CN | 102763178 A | | 10/2012 | |
| CN | 103302393 A | | 9/2013 | |
| CN | 103947085 A | | 7/2014 | |
| CN | 114175189 A | | 3/2022 | |
| CN | 114175189 A | * | 3/2022 | ......... H01F 27/2823 |
| DE | 2530411 A1 | | 1/1977 | |
| DE | 2606235 A1 | | 8/1977 | |
| DE | 10239730 A1 | | 3/2004 | |
| DE | 102012010226 A1 | | 11/2013 | |
| DE | 102012207228 A1 | | 11/2013 | |
| DE | 102013007507 A1 | | 3/2014 | |
| EP | 1511047 A2 | * | 3/2005 | ......... H01F 27/2847 |
| GB | 892874 A | | 4/1962 | |
| GB | 1145265 A | | 3/1969 | |
| GB | 2198673 A | | 6/1988 | |
| GB | 2288138 A | | 10/1995 | |
| GB | 2407919 A | * | 5/2005 | ......... H01F 27/2852 |
| JP | S50-139903 A | | 11/1975 | |
| JP | S58-16783 A | | 1/1983 | |
| JP | S59-199186 A | | 11/1984 | |
| JP | S59-209045 A | | 11/1984 | |
| JP | S59-209046 A | | 11/1984 | |
| JP | S60-176443 A | | 9/1985 | |
| JP | S62-13281 A | | 1/1987 | |
| JP | S62-40041 A | | 2/1987 | |
| JP | H1-157782 A | | 6/1989 | |
| JP | 2003-37011 A | | 2/2003 | |
| JP | 2005026608 A | * | 1/2005 | ........... B23K 20/023 |
| JP | 2005-130676 A | | 5/2005 | |
| JP | 2005-304244 A | | 10/2005 | |
| JP | 3881520 B2 | | 11/2006 | |
| JP | 2007-221912 A | | 8/2007 | |
| JP | 2008-167593 A | | 7/2008 | |
| JP | 2009-194999 A | | 8/2009 | |
| JP | 2009-195005 A | | 8/2009 | |
| JP | 2009-302593 A | | 12/2009 | |
| JP | 2011-109899 A | | 6/2011 | |
| JP | 2011-167053 A | | 8/2011 | |
| JP | 2014-120762 A | | 6/2014 | |
| JP | 5592554 B1 | | 8/2014 | |
| JP | 2015-116590 A | | 6/2015 | |
| TW | 201212061 A | | 3/2012 | |
| WO | 90/09862 A1 | | 9/1990 | |
| WO | 02/32612 A1 | | 4/2002 | |
| WO | WO-2004105063 A2 | * | 12/2004 | ......... H01F 27/2847 |
| WO | 2006/063551 A1 | | 2/2006 | |
| WO | 2011/132626 A1 | | 10/2011 | |
| WO | 2013/099001 A1 | | 7/2013 | |
| WO | 2013/121668 A1 | | 8/2013 | |
| WO | 2013/175885 A1 | | 11/2013 | |
| WO | WO-2021153347 A1 | * | 8/2021 | ......... H01F 27/2847 |

OTHER PUBLICATIONS

Communication pursuant to Article 94(3) EPC dated Aug. 25, 2017, directed to EP Application No. 14 870 832.4; 11 pages.

Extended European Search Report dated Dec. 19, 2018, directed to EP Application No. 18191373.2; 9 pages.

Extended European Search Report dated Nov. 22, 2017, directed to EP Application No. 17185743.6; 20 pages.

First Office Action dated Dec. 30, 2019, directed to CN Application No. 201810971355.3; 13 pages.

Hongo, U.S. Office Action dated Apr. 10, 2020, directed to U.S. Appl. No. 16/116,188; 7 pages.

Hongo, U.S. Office Action dated Aug. 24, 2023, directed to U.S. Appl. No. 17/810,190; 7 pages.

Hongo, U.S. Office Action dated Aug. 9, 2021, directed to U.S. Appl. No. 16/864,953; 9 pages.

Hongo, U.S. Office Action dated Dec. 6, 2021, directed to U.S. Appl. No. 16/864,953; 9 pages.

Hongo, U.S. Office Action dated Feb. 3, 2020, directed to U.S. Appl. No. 16/116,188; 9 pages.

(56) References Cited

OTHER PUBLICATIONS

Hongo, U.S. Office Action dated Jul. 13, 2022, directed to U.S. Appl. No. 16/864,953; 7 pages.
Hongo, U.S. Office Action dated Jun. 5, 2018, directed to U.S. Appl. No. 15/105,485; 10 pages.
Hongo, U.S. Office Action dated Nov. 18, 2022, directed to U.S. Appl. No. 16/864,953; 9 pages.
International Search Report dated Mar. 31, 2015, directed to International Application No. PCT/JP2014/083556; 12 pages.
Notice of Reasons for Refusal dated Feb. 1, 2022, directed to JP Application No. 2021-015887; 11 pages.
Notice of Reasons for Refusal dated Oct. 27, 2020, directed to JP Application No. 2019-140679; 9 pages.
Office Action dated May 18, 2021, directed to EP Application No. 18191373.2; 9 pages.
Office Action dated Nov. 16, 2017, directed to CN Application No. 201480069138.5; 5 pages.
Office Action dated Oct. 30, 2018, directed to Japanese Application No. 2017-214584; 6 pages.
Partial Supplementary Search Report dated Dec. 12, 2016, directed to EP Application No. 14870832.4, 8 pages.
The First Office Action dated Jun. 26, 2023, directed to CN Application No. 202110259915.4; 17 pages.
Third Office Action dated Jul. 7, 2021, directed to CN Application No. 201810971355.3; 11 pages.

\* cited by examiner

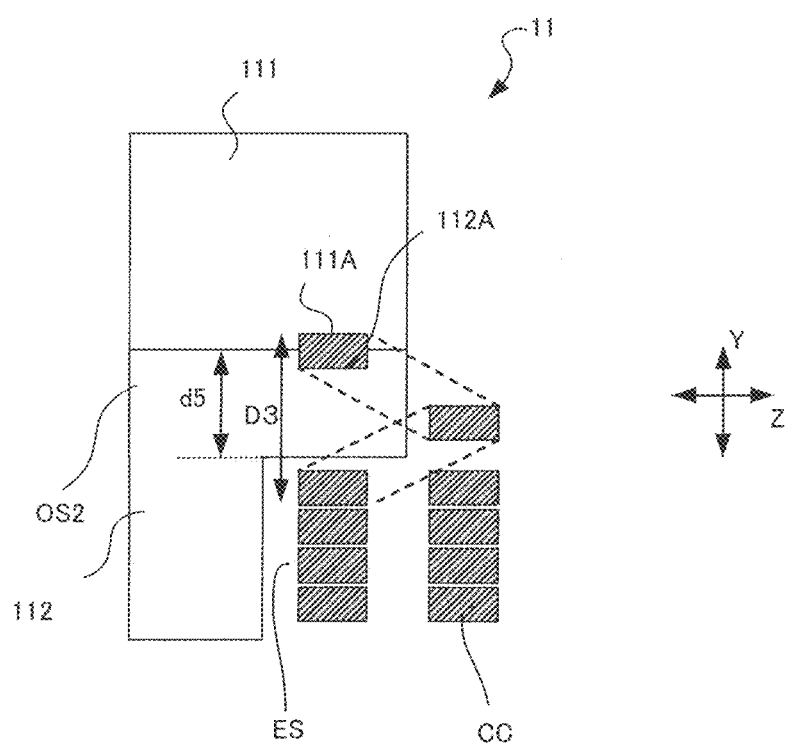

→ Coated with Insulating Resin

→ Coated with Insulating Resin

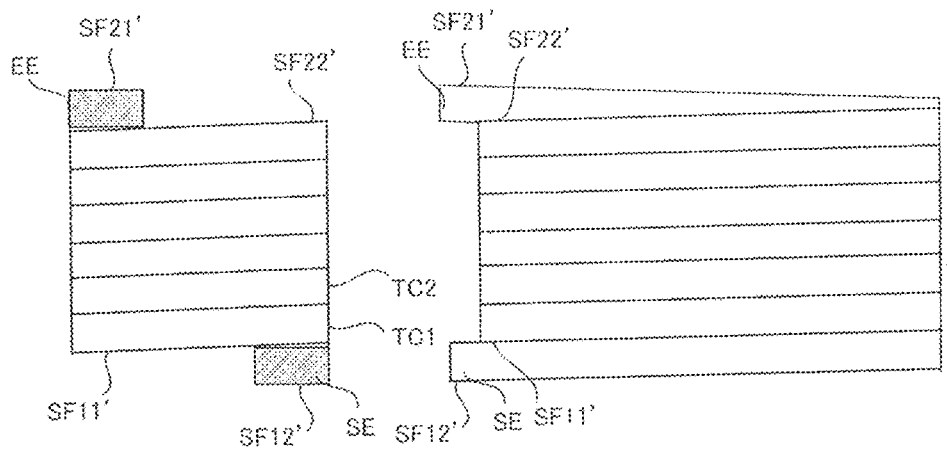
Fig. 16A
Fig. 16B
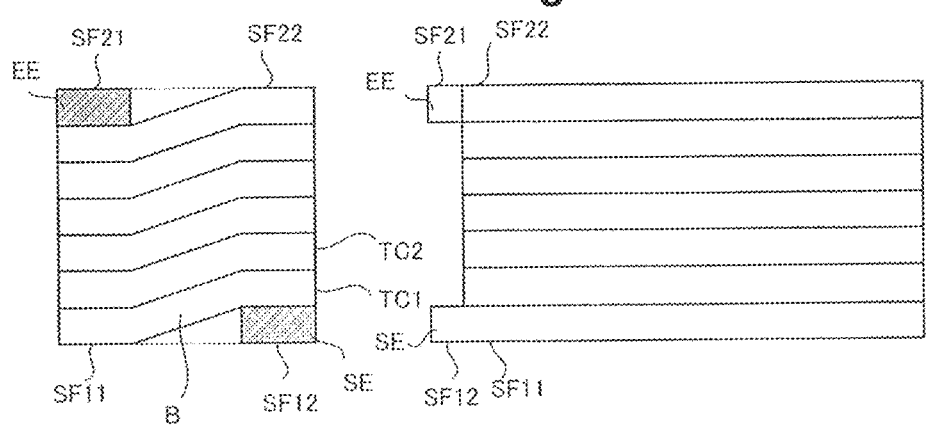
Fig. 16C
Fig. 16D
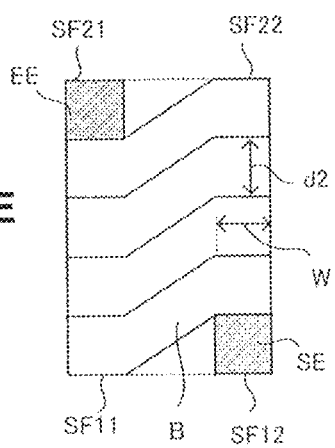
Fig. 16E

COLD PRESSURE WELDING APPARATUS, COIL MANUFACTURING APPARATUS, COIL, AND METHOD OF MANUFACTURING THE SAME

CROSS-REFERENCE TO RELATED APPLICATIONS

This application is a continuation of U.S. patent application Ser. No. 16/864,953, filed May 1, 2020, which is a divisional of U.S. patent application Ser. No. 16/116,188, filed Aug. 29, 2018, now U.S. Pat. No. 10,742,097, which is a divisional of U.S. patent application Ser. No. 15/105,485, filed Jun. 16, 2016, now U.S. Pat. No. 10,211,710, which is a U.S. National Stage patent application of PCT/JP2014/083556, filed Dec. 18, 2014, which claims priority to Japanese Patent Application Nos. 2014-252885, filed Dec. 15, 2014, and 2013-261581, filed Dec. 18, 2013, the entire contents of each priority application of which are incorporated herein by reference.

FIELD OF THE INVENTION

The present invention relates to: a cold pressure welding apparatus for welding flat plates together by causing the flat plates to be pressurized and deformed; a coil manufacturing apparatus; a coil; and a method of manufacturing the coil.

BACKGROUND OF THE INVENTION

Examples of a coil apparatus in which a coil is arranged around a core of a stator core may include electrical devices such as motors, electric generators, and transformers. In such a coil apparatus, it is important to improve the space factor of the coil in the core in order to achieve loss reduction and the miniaturization thereof.

Coils using rectangular conductors (hereinafter referred to as rectangular coils) have been known in the art as coils capable of improving space factors in cores. The rectangular coil is referred to also as a flatwise (square-winding) coil, a square (square type) coil, an edgewise coil, etc. In contrast to a coil formed by winding a round conductive wire having a generally round cross section perpendicular to the longitudinal direction thereof, the rectangular coil refers to a coil formed by winding a rectangular conductor having a rectangular cross section perpendicular to the longitudinal direction thereof.

A method of winding an elongated rectangular conductive wire (square conductive wire) in a generally rectangular shape has been also known in the art as a method of manufacturing a rectangular coil (see Patent Literature 1, for example). A method of making a helical structure by repeatedly performing stacking rectangular conductors (flat conductive materials), each having a length corresponding to one coil turn, on each other and joining such layers together by welding means with the upper surface of an end edge in the lower layer and the lower surface of a start edge in the upper layer being overlapped with each other has been also known in the art (see Patent Literature 2, for example).

A cold pressure welding method has also been known in the art as a method of connecting conductors.

PATENT LITERATURE

Patent Literature 1: Japanese Patent No. 3881520
Patent Literature 2: Japanese Patent Application Laid-Open No. 2005-130676

SUMMARY OF THE INVENTION

According to the method of winding an elongated rectangular conductive wire in a generally rectangular shape as in the technique described in Patent Literature 1, however, corner portions (both on the outer peripheral side and the inner peripheral side) of the wound wire are inevitably curved to have rounded corners. A typical core has a shape of a rectangular column having generally right-angle corner portions. If a coil having rounded corners is arranged around such a core, a space is created between the core and the coil. Such a space deteriorates the heat dissipation performance of the coil apparatus due to its accumulation of heat during the operation of the coil apparatus. Consequently, due to increased coil resistance, the coil apparatus fails to achieve high efficiency. Moreover, such corner portions have limitations on improvement in coil space factor.

Moreover, the outer periphery of the rectangular conductive wire used in the coil is coated with an insulating resin beforehand. Thus, if such a rectangular conductive wire is wound, the coating is reduced at the outer peripheral corner portions due to the bending, leading to deterioration in the pressure resistance of the coil apparatus.

For the method of stacking and welding rectangular conductors, each corresponding to one coil turn, as in the technique described in Patent Literature 2, on the other hand, corner portions of such a coil can have a non-curved shape. The above-described problems about the heat dissipation performance and the space factor can therefore be eliminated. Although the conductors are connected together by welding means, the welded portion between the upper surface of the end edge in the lower layer and the lower surface of a start edge in the upper layer inevitably has deteriorated characteristics as compared to uncut portions. Thus, this technique still has a problem in terms of stable operation.

Furthermore, a method of cold pressure welding round wire conductors has been known in the art as one of methods of connecting conductors together. However, it has been difficult to successfully cold pressure weld rectangular conductive wires together while improving the stability of their connected portions.

It is an object of the present invention to provide a cold pressure welding apparatus and a coil manufacturing apparatus capable of successfully cold pressure welding even rectangular conductors together and improving the stability of their connected portions and to provide a rectangular conductor coil, capable of improving its space factor and its heat dissipation performance and causing no characteristic deterioration due to cutting and welding, and a method of manufacturing such a coil.

The present invention solves the above-mentioned problems by the following means.

(1) An aspect of the present invention provides a cold pressure welding apparatus including: a first holding part capable of sandwiching a first flat conductor; a second holding part disposed opposite to the first holding part and capable of sandwiching a second flat conductor; and a drive part for moving the first holding part and the second holding part. The drive part can move the first holding part and the second holding part between a first direction separated position and a close position along a first direction, and can move the first holding part and the second holding part between a second direction separated position and a sandwiching position along a second direction. In a sandwiching state, the drive part moves the first holding part and the second holding part to the sandwiching position, so that the first holding part sandwiches the first flat conductor and the second holding part sandwiches the second flat conductor. In a pressure welding state, the drive part moves the first holding part and the second holding part in the sandwiching state from the first direction separated position to a direction toward the close position, so that an end face of the first flat conductor and an end face of the second flat conductor are butted and pressed against each other, and thus welded together. In a retracted state, the drive part moves the first holding part and the second holding part to the first direction separated position and to the second direction separated position, respectively.

(2) An aspect of the present invention also relates to the above-described invention and provides the cold pressure welding apparatus according to (1) above characterized in that the first holding part is provided with a groove having a depth smaller than a thickness of the first flat conductor and a width equal to a width of the first flat conductor, and the second holding part is provided with a groove having a depth smaller than a thickness of the second flat conductor and a width equal to a width of the second flat conductor.

(3) An aspect of the present invention also relates to the above-described invention and provides the cold pressure welding apparatus according to (1) or (2) above characterized in by including movement restraining members for holding the first flat conductor and the second flat conductor at predetermined positions in the first direction at least in the retracted state.

(4) An aspect of the present invention also relates to the above-described invention and provides the cold pressure welding apparatus according to any one of (1) to (3) above characterized in that sandwiching surfaces of the first holding part and sandwiching surfaces of the second holding part each at least partially include an anti-slip finished surface.

(5) An aspect of the present invention also relates to the above-described invention and provides the cold pressure welding apparatus according to (4) above characterized in that the anti-slip finished surface is a surface with high frictional resistance.

(6) An aspect of the present invention also relates to the above-described invention and provides the cold pressure welding apparatus according to (4) above characterized in that the anti-slip finished surface is a high adsorptive surface.

(7) An aspect of the present invention also relates to the above-described invention and provides the cold pressure welding apparatus according to any one of (1) to (6) above characterized by including a biasing member for biasing the first holding part and the second holding part in a direction in which they are separated away from each other.

(8) An aspect of the present invention provides a coil manufacturing apparatus for forming a helical structure by connecting together a plurality of strip-shaped flat conductors capable of having a helical shape when continuously joined together. The coil manufacturing apparatus includes: a first holding part and a second holding part capable of sandwiching one of the flat conductors and a different one of the flat conductors, respectively, and disposed opposite to each other; and a drive part for moving the first holding part and the second holding part. The helical structure is formed by: setting a prepared length, corresponding to a total distance of the plurality of flat conductors in a strip longitudinal direction, to be longer than a finished length of the helical structure to be finally obtained in a helical longitudinal direction by a margin; pressing end faces of the plurality of flat conductors against each other along the strip longitudinal direction and thus shortening distances thereof in the strip longitudinal direction to cold pressure weld the end faces together; and setting a total shortened distance, corresponding to an amount shortened by the cold pressure welding of all of the plurality of flat conductors, to the margin.

(9) An aspect of the present invention also relates to the above-described invention and provides the coil manufacturing apparatus according to (8) above characterized in that the drive part can move the flat conductor and the different flat conductor between a first direction separated position and a close position along a first direction; the drive part can move the first holding part and the second holding part between a second direction separated position and a sandwiching position along a second direction; in a sandwiching state, the drive part moves the first holding part and the second holding part to the sandwiching position, so that the first holding part sandwiches the flat conductor and the second holding part sandwiches the different flat conductor; in a pressure welding state, the drive part moves the first holding part and the second holding part in the sandwiching state from the first direction separated position to a direction toward the close position, so that an end face of the flat conductor and an end face of the different flat conductor are butted and pressed against each other, and thus welded together; and in a retracted state, the drive part moves the first holding part and the second holding part to the first direction separated position and to the second direction separated position, respectively.

(10) An aspect of the present invention also relates to the above-described invention and provides the coil manufacturing apparatus according to (9) above characterized in that: the first holding part and the second holding part are each configured by a first holder and a second holder capable of moving along the second direction; the first holder and the second holder each include a flat conductor holding groove, and the flat conductor and the different flat conductor are held by the flat conductor holding grooves when the first holder and the second holder abut against each other; one holder end face constituted by one end face of the first holder and one end face of the second holder is positioned in a space to be inside the helical structure; and a distance from the holder end face to the closest end of the flat conductor holding groove is smaller than a distance of the space to be inside the helical structure along a third direction.

(11) An aspect of the present invention also relates to the above-described invention and provides the coil manufacturing apparatus according to (9) or (10) above characterized by including movement restraining members for holding the flat conductor and the different flat conductor at predetermined positions in the first direction at least in the retracted state.

(12) An aspect of the present invention also relates to the above-described invention and provides the coil manufacturing apparatus according to any one of (8) to (11) above characterized in that sandwiching surfaces of the first holding part and sandwiching surfaces of the second holding part each at least partially include an anti-slip finished surface.

(13) An aspect of the present invention also relates to the above-described invention and provides the coil manufacturing apparatus according to (12) above characterized in that the anti-slip finished surface is a surface with high frictional resistance.

(14) An aspect of the present invention also relates to the above-described invention and provides the coil manufacturing apparatus according to (12) above characterized in that the anti-slip finished surface is a high adsorptive surface.

(15) An aspect of the present invention also relates to the above-described invention and provides the coil manufacturing apparatus according to any one of (8) to (14) above characterized by including a biasing member for biasing the first holding part and the second holding part in a direction in which they are separated away from each other.

(16) An aspect of the present invention also relates to the above-described invention and provides the coil manufacturing apparatus according to any one of (8) to (15) above characterized in that the flat conductor is cold pressure welded with the different flat conductor while a portion of the flat conductor excluding a vicinity of an end face to be cold pressure welded is elastically deformed and/or plastically deformed in a helical traveling direction of the helical structure.

(17) An aspect of the present invention also relates to the above-described invention and provides the coil manufacturing apparatus according to (16) above characterized in that a deformed amount of the elastic deformation and/or the plastic deformation of the flat conductor in the helical traveling direction is set to an amount to avoid interference between the first and second holding parts and the flat conductor.

(18) An aspect of the present invention also relates to the above-described invention and provides the coil manufacturing apparatus according to any one of (8) to (17) above characterized in that at least one of the flat conductor and the different flat conductor is a U-shaped coil piece having two corner portions.

(19) An aspect of the present invention also relates to the above-described invention and provides the coil manufacturing apparatus according to any one of (8) to (18) above characterized in that the cold pressure welding is performed while measuring the distances in the strip longitudinal direction.

(20) An aspect of the present invention also relates to the above-described invention and provides the coil manufacturing apparatus according to (19) above characterized in that sliding of the flat conductor and the different flat conductor when pressed against each other is detected in the measurement of the distances in the strip longitudinal direction.

(21) An aspect of the present invention also relates to the above-described invention and provides the coil manufacturing apparatus according to (10) above characterized in that: a plurality of holding units each comprising the first holding part and the second holding part are provided; the plurality of holding units each at least have a different depth of the flat conductor holding groove; and the helical structure having an outer shape of a truncated quadrangular pyramid is formed while being sequentially moved among the plurality of holding units.

(22) An aspect of the present invention also relates to the above-described invention and provides the coil manufacturing apparatus according to any of (8) to (21) above characterized in that an interference avoidance space for accommodating part of the flat conductor on a front side in a helical traveling direction of the helical structure.

(23) An aspect of the present invention provides a coil manufacturing method of forming a helical structure by connecting a plurality of flat conductors together. The method includes: preparing the plurality of strip-shaped flat conductors capable of forming the helical structure when continuously joined together; setting a prepared length, corresponding to a total distance of the plurality of flat conductors in a strip longitudinal direction, to be longer than a finished length of a helical structure to be finally obtained in a helical longitudinal direction by a margin; pressing end faces of the plurality of flat conductors against each other along the strip longitudinal direction and thus shortening distances thereof in the strip longitudinal direction to cold pressure weld the end faces together; and setting a total shortened distance, corresponding to an amount shortened by the cold pressure welding of all of the plurality of flat conductors, to the margin.

(24) An aspect of the present invention also relates to the above-described invention and provides the coil manufacturing method according to (23) above characterized in that the flat conductor is cold pressure welded with a different one of the flat conductors while a portion of the flat conductor excluding a vicinity of an end face to be cold pressure welded is elastically deformed and/or plastically deformed in a helical traveling direction of the helical structure.

(25) An aspect of the present invention also relates to the above-described invention and provides the coil manufacturing method according to (24) above characterized in that a deformed amount of the elastic deformation and/or the plastic deformation of the flat conductor in the helical traveling direction is set to an amount to avoid interference between the holding parts holding the flat conductors respectively and the flat conductor during the cold pressure welding.

(26) An aspect of the present invention also relates to the above-described invention and provides the coil manufacturing method according to any one of (23) to (25) above characterized in that at least one of the flat conductor and the different flat conductor is a U-shaped coil piece having two corner portions.

(27) An aspect of the present invention also relates to the above-described invention and provides the coil manufacturing method according to any one of (23) to (26) above characterized in that the cold pressure welding is performed while measuring the distances in the strip longitudinal direction.

(28) An aspect of the present invention also relates to the above-described invention and provides the coil manufacturing method according to (27) above characterized in that sliding of the flat conductor and the different flat conductor when pressed against each other is detected in the measurement of the distances in the strip longitudinal direction.

(29) An aspect of the present invention also relates to the above-described invention and provides the coil manufacturing method according to any one of (23) to (28) above characterized by including: a step of integrally shaping the helical structure in a desired form; and a step of integrally coating the shaped helical structure.

(30) An aspect of the present invention also relates to the above-described invention and provides the coil manufacturing method according to any one of (23) to (29) above characterized in that the helical structure is shaped in a curved form in which an inner peripheral end thereof is not coplanar with an outer peripheral end thereof.

(31) An aspect of the present invention provides a coil including a helical structure formed by continuously joining strip-shaped flat conductors in a helical shape in which a first helical turn of the helical structure partially includes a first thin portion with a plate thickness thinner than a plate thickness of the other part of the flat conductor, and a second turn continuous with the first turn partially includes a second thin portion with a plate thickness thinner than the plate thickness of the other part of the flat conductor.

(32) An aspect of the present invention also relates the above-described invention and provides the coil according to (31) above characterized in that the first thin portion is provided at least at two positions in the first turn, and the second thin portion is provided at least at one position in the second turn.

(33) An aspect of the present invention also relates the above-described invention and provides the coil according to (31) or (32) above characterized in that the first thin portion and the second thin portion are provided at overlapping positions in an axial center direction of the helical structure, and a space is created between the first and second thin portions.

(34) An aspect of the present invention also relates the above-described invention and provides the coil according to any one of (31) to (33) above characterized in that the helical structure is integrally coated.

(35) An aspect of the present invention also relates the above-described invention and provides the coil according to any one of (31) to (34) above characterized in that the helical structure is shaped in a curved form in which an inner peripheral end thereof is not coplanar with an outer peripheral end thereof.

(36) An aspect of the present invention also relates the above-described invention and provides the coil according to (34) above characterized in that a gap of the flat conductor is formed between the first thin portion and the second thin portion, and part of the coating is embedded in the gap.

(37) An aspect of the present invention provides a coil manufacturing method including: a step of preparing a plurality of strip-shaped flat conductors capable of forming a helical structure when continuously joined together and connecting end faces of the plurality of flat conductors together to form the helical structure; a step of integrally shaping the helical structure in a desired form; and a step of integrally coating the shaped helical structure.

(38) An aspect of the present invention also provides the coil manufacturing method according to (37) above characterized in that part of a first helical turn of the helical structure is deformed to have a level difference corresponding to a thickness of the flat conductor along a helical traveling direction, and part of a second helical turn of the helical structure is deformed to have the level difference corresponding to the thickness of the flat conductor along the helical traveling direction.

(39) An aspect of the present invention also provides the coil manufacturing method according to (38) above characterized in that the part of the first turn and the part of the second turn are positioned on the same side surface of the helical structure.

(40) An aspect of the present invention also provides the coil manufacturing method according to any one of (37) to (39) above characterized in that at least some of the plurality of flat conductors have different widths in a strip width direction and/or different thicknesses.

(41) An aspect of the present invention also provides the coil according to (31) above characterized in that part of the first turn of the helical structure is deformed to have a level difference along a helical traveling direction, and part of the second turn is deformed to have a level difference along the helical traveling direction.

(42) An aspect of the present invention also provides the coil manufacturing method according to (41) above characterized in that the part of the first turn and the part of the second turn are positioned on the same side surface of the helical structure.

(43) An aspect of the present invention also provides the coil manufacturing method according to any one of (31), (41), and (42) above characterized in that the helical structure has varying widths in a strip width direction and/or thicknesses of the flat conductors connected along the helical traveling direction.

The present invention can provide a cold pressure welding apparatus and a coil manufacturing apparatus capable of successfully cold pressure welding even rectangular conductors and improving the stability of their connected portions and provide a rectangular conductor coil, capable of improving its space factor and its heat dissipation performance and causing no characteristic deterioration due to cutting and welding, and a method of manufacturing such a coil.

BRIEF DESCRIPTION OF THE DRAWINGS

FIG. 7A is a side view of a holding part; FIG. 7B is a front view of a coil; and FIG. 7C is a front view of the holding part.

FIG. 8 is a side view of the holding part in the coil manufacturing apparatus according to the present embodiment.

FIG. 13A is a front view; FIG. 13B is a cross-sectional view; and FIG. 13C is a side view.

FIG. 15A is a side view; FIG. 15B is a cross-sectional view of FIG. 15A; and FIG. 15C is a cross-sectional view of FIG. 15A.

FIGS. 16A-16E include side views illustrating a helical structure of the coil according to the present embodiment.

FIG. 17A is an external perspective view; FIG. 17B is a side view; FIG. 17C is an external perspective view; and FIG. 17D is a side view.

DETAILED DESCRIPTION OF THE INVENTION

An embodiment of the present invention will now be described below in detail with reference to the drawings.

Figure 1A:
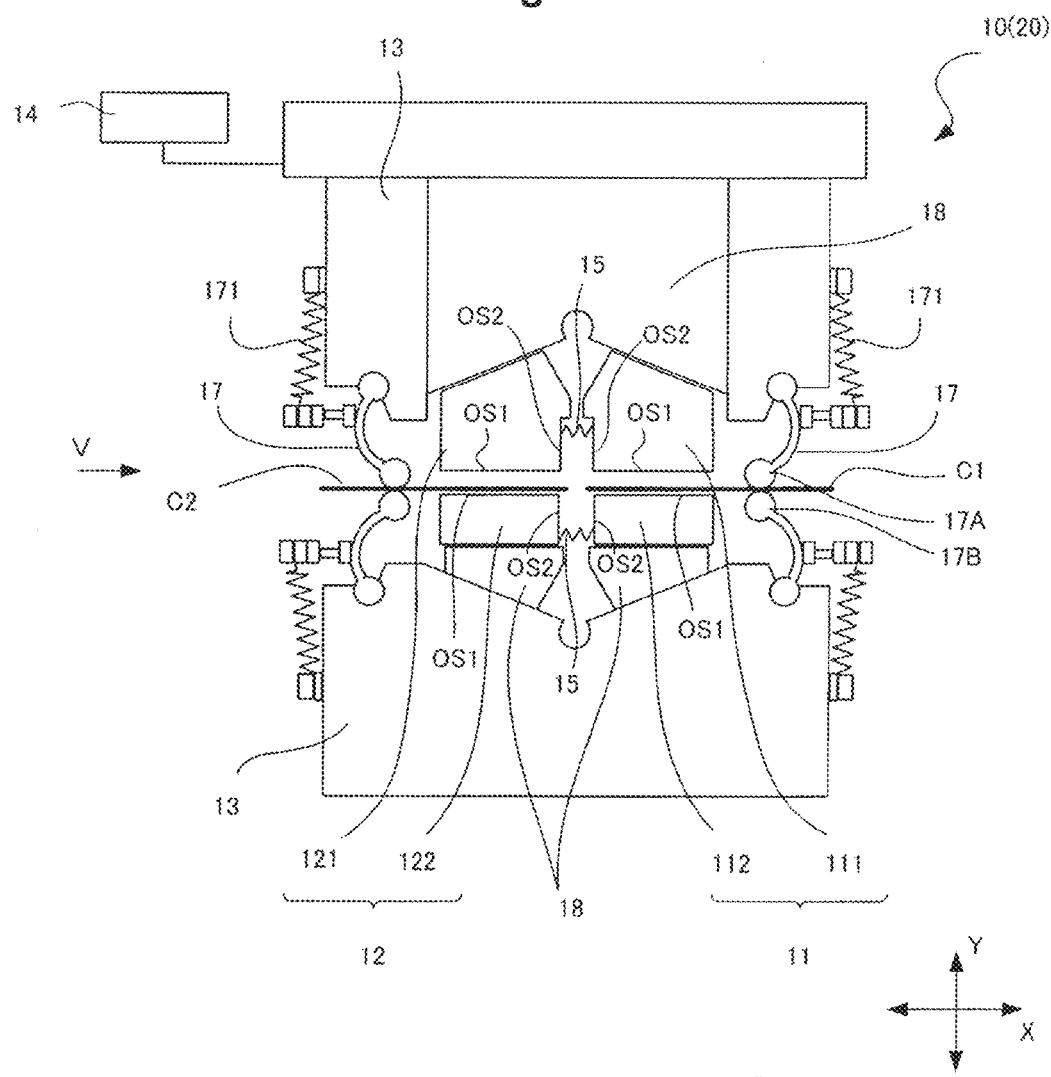
FIG. 1A is an external view (front view) schematically illustrating part of a configuration of a cold pressure welding apparatus according to the present embodiment.
Figure 1B:
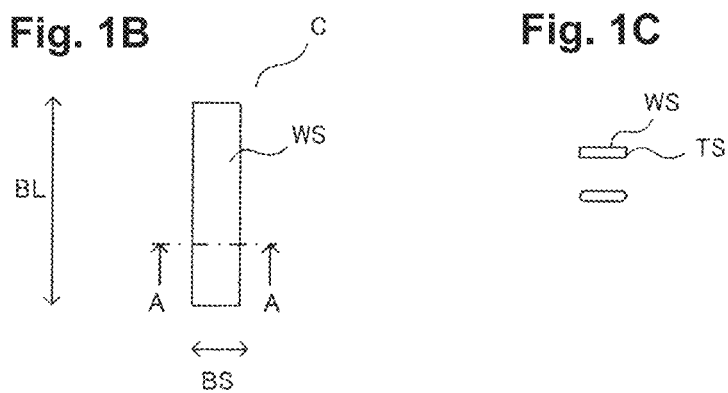
FIG. 1B is a top view of a flat conductor.
Figure 1C:
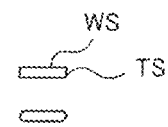
FIG. 1C is a cross-sectional view taken along line A-A of FIG. 1B.

FIGS. 1A-1C include diagrams for explaining a cold pressure welding apparatus 10 according to the present embodiment. FIG. 1A is an external view (front view) schematically illustrating part of the configuration of the cold pressure welding apparatus 10; FIG. 1B is a top view of a flat conductor C; and FIG. 1C is a cross-sectional view taken along line A-A of FIG. 1B As shown in FIG. 1A, the cold pressure welding apparatus 10 is an apparatus for cold pressure welding two flat conductors C (C1 and C2). The cold pressure welding apparatus 10 includes a first holding part 11, a second holding part 12, a drive part 13, and a control part 14. Note that the flat conductor C as used in the following description refers to a strip-shaped (tape-shaped) conductor configured by flat surfaces as shown in FIGS. 1B and 1C in contrast to a round wire conductor. More specifically, the flat conductor refers to a strip-shaped member extended long in a predetermined direction and having two wider surfaces WS opposite to each other and two narrower surfaces WT opposite to each other as shown in FIGS. 1B and 1C as well as a conductor with a cross section taken perpendicular to a strip longitudinal direction BL (cross section taken along line A-A of FIG. 1B) being rectangular or rectangular with rounded corners as shown in FIG. 1C. The following description employs, as an example of the flat conductor, a rectangular conductor (FIG. 1B and the upper diagram in FIG. 1C) having a rectangular cross section perpendicular to the strip longitudinal direction. The flat conductor C as used in the present invention only needs to be a strip-shaped conductor configured by flat surfaces in contrast to the round wire conductor. The cross-sectional view of the conductor in the cross section taken along line A-A in FIG. 1B may have an approximately square shape.

The first holding part 11 can move along a first direction (the strip longitudinal direction of the rectangular conductor; an X direction in FIG. 1A). The first holding part 11 is configured by a first upper holder 111 and a first lower holder 112. The first upper holder 111 and the first lower holder 112 are disposed oppositely so as to have opposed surfaces OS1 along the first direction (hereinafter referred to as the X direction). Although the upper holder shown in the figure is referred to as the first upper holder 111 and the lower holder shown in the figure is referred to as the second lower holder 112 in the present embodiment for ease of explanation, such an upper and lower relationship is not necessarily limited to the upper and lower relationship in the vertical direction. In other words, FIG. 1A may be a top view of the cold pressure welding apparatus 10. In such a case, the first upper holder 111 becomes a rear-side holder, for example, and the first lower holder 112 becomes a front-side holder, for example. Alternatively, the first upper holder 111 may be a left holder, for example, and the first lower holder 112 may be a right holder, for example.

The first upper holder 111 and the first lower holder 112 can move along the X direction and the opposed surfaces OS1 along the X direction can move along a second direction (the plate thickness direction of the rectangular conductor; a Y direction in FIG. 1A) so as to abut against or separate from each other. The Y direction is a direction different from the X direction, for example, the direction perpendicular to the X direction.

The second holding part 12 is disposed opposite to the first holding part 11 so that these parts have opposed surfaces OS2 along the second direction (hereinafter referred to as the Y direction). The second holding part 12 has a configuration similar to that of the first holding part 11. Although the detailed description thereof is therefore omitted, the second holding part 12 can move along the X direction and is configured by a second upper holder 121 and a second lower holder 122. The description about the "upper and lower relationship" of the second upper holder 121 and the second lower holder 122 is similar to that of the first holding part 11.

The second upper holder 121 and the second lower holder 122 can move along the X direction and the opposed surfaces OS1 thereof can move along the Y direction so as to abut against or separate from each other.

The first holding part 11 and the second holding part 12 are biased by biasing members (for example, coil springs) 15 in a direction in which they are separated away from each other along the X direction. Although the diagrammatic illustration is omitted, the first upper holder 111 and the first lower holder 112 are biased by a biasing member (for example, a coil spring) in a direction in which they are separated away from each other along the Y direction, and the second upper holder 121 and the second lower holder 122 are biased by a biasing member (for example, a coil spring) in a direction in which they are separated away from each other along the Y direction.

The drive part 13 moves the first holding part 11 and the second holding part 12 along the X and Y directions via a drive transmission part (not shown) in accordance with an instruction from the control part 14.

Movement restraining units 17 for mainly inhibiting the movement of the first rectangular conductor C1 and the second rectangular conductor C2 in the Y direction are provided lateral to the first holding part 11 and the second holding part 12 in the X direction. The movement restraining units 17 abut against the both surfaces of the first rectangular conductor C1 (second rectangular conductor C2) to restrain movement in the Y direction. Additionally, the movement restraining units 17 allow for movement toward one direction (direction in which the first rectangular conductor C1 and the second rectangular conductor C2 are close to each other) along the X direction and restrain movement toward the other direction (direction in which the first rectangular conductor C1 and the second rectangular conductor C2 are away from each other) along the X direction. More specifically, the movement restraining units 17 are roller bodies biased toward the center direction of the first holding part 11 and the second holding part 12 by biasing members (for example, coil springs or flat springs) 171. The movement restraining unit 17 is provided with projections and depressions, which are not shown, (for example, projections and depressions in a shape of a saw blade) along a circumferential direction at both ends in a rotational center axis direction. Such roller bodies hold the rectangular conductors. To explain movement restraining parts 17A and 17B of the first holding part 11, for example, when the first rectangular conductor C1 moves in the left direction in the figure along the X direction, the movement restraining part 17A rotates clockwise and the movement restraining part 17B rotates counterclockwise. This allows for the movement of the first rectangular conductor C1. When the first rectangular conductor C1 moves in the right direction in the figure along the X direction, on the other hand, the movement restraining part 17A tries to rotate counterclockwise and the movement restraining part 17B tries to rotate clockwise. However, the projections and depressions provided along the circumferential direction at the both ends of the central axis mesh with each other, thus preventing the rotation. The movement of the first rectangular conductor C1 in the right direction is thus restrained. The same applies to the second holding part 12.

Moreover, pressing parts 18 are provided lateral to the first holding part 11 and the second holding part 12 in the Y direction. The pressing parts 18 press the first upper holder 111 and the first lower holder 112 so that these holders abut against each other. The pressing parts 18 also press the second upper holder 121 and the second lower holder 122 so that these holders abut against each other.

FIGS. 2A-2C and 3A-3B are front views each illustrating the demounted first holding part 11 and second holding part 12. These are diagrams illustrating states of their movement.

Figure 2A:
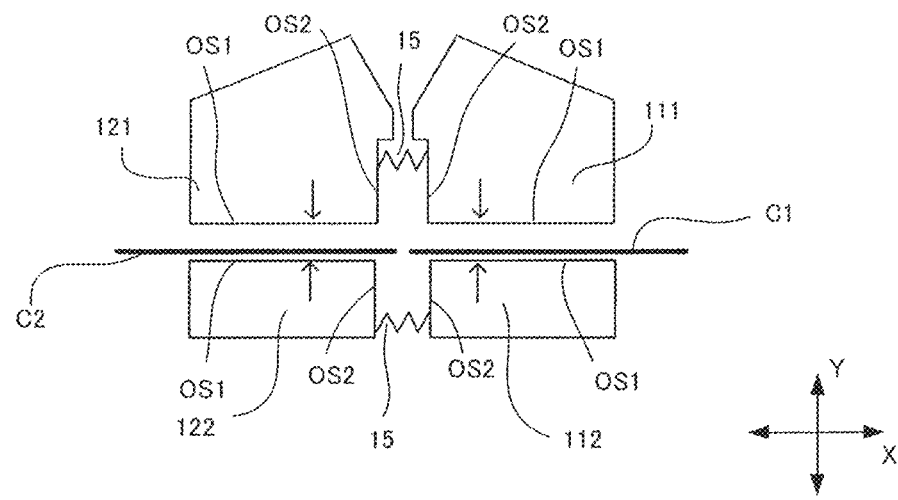
FIGS. 2A-2C include external views (front views) schematically illustrating holding parts of the cold pressure welding apparatus according to the present embodiment.
Figure 2B:
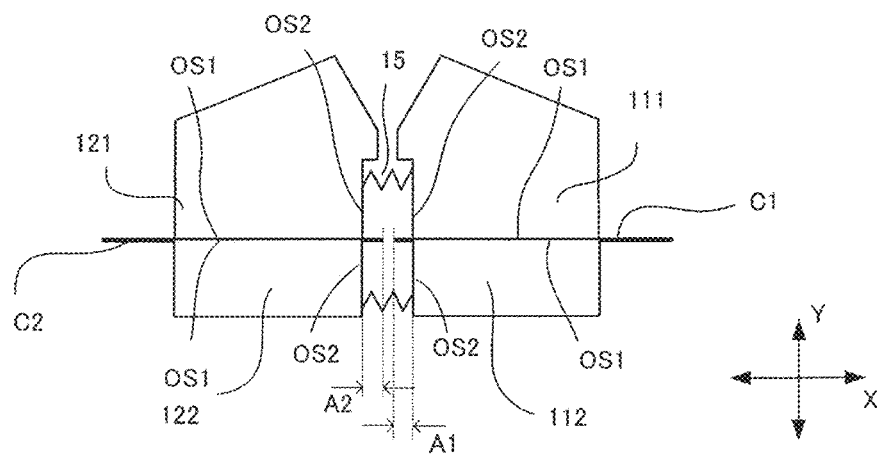
Figure 2C:
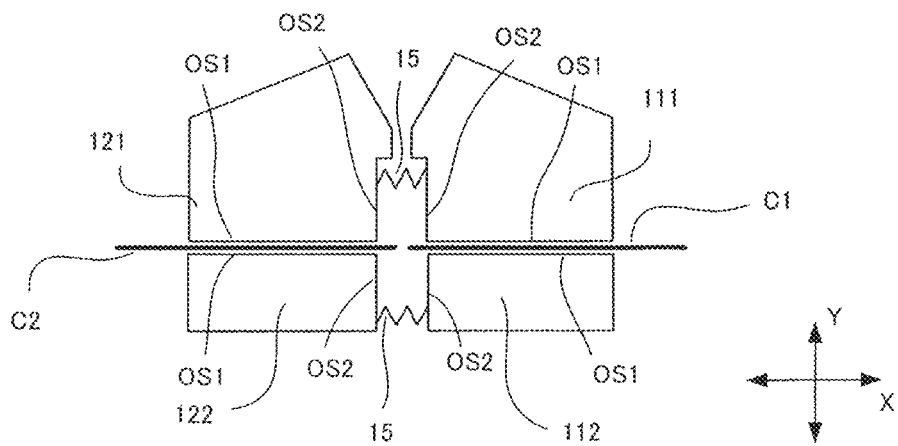

FIGS. 2A-2C include diagrams for explaining mainly the movement of the first holding part 11 (the first upper holder 111 and the first lower holder 112) and the second holding part 12 (the second upper holder 121 and the second lower holder 122) mainly along the Y direction.

The state in FIG. 2A shows a position at which the opposed surfaces OS1 of the first upper holder 111 and the first lower holder 112 (the same applies to the second upper holder 121 and the second lower holder 122) are separated farthest from each other in the Y direction. Hereinafter, such a position will be referred to as a Y direction separated position. This state also shows a position at which the opposed surfaces OS2 of the first holding part 11 and the second holding part 12 are separated farthest from each other in the X direction. Hereinafter, such a position will be referred to as an X direction separated position.

FIG. 2B shows a state in which the first upper holder 111 and the first lower holder 112 have moved to a position at which the opposed surfaces OS1 thereof abut against each other from the state shown in FIG. 2A. In this state, the first holding part 11 sandwiches (the wider surfaces WS of) the first rectangular conductor by the first upper holder 111 and the first lower holder 112, and the second holding part 12 sandwiches (the wider surfaces WS of) the second rectangular conductor by the second upper holder 121 and the second lower holder 122.

The first holding part 11 sandwiches the first rectangular conductor C1 so that the first rectangular conductor C1 projects in the direction of the second holding part 12 from the opposed surfaces OS2 along the Y direction. Similarly, the second holding part 12 sandwiches the second rectangular conductor C2 so that the second rectangular conductor C2 projects in the direction of the first holding part 11 from the opposed surfaces OS2 along the Y direction. A projected amount A1 of the first rectangular conductor C1 from the first holding part 11 and a projected amount A2 of the second rectangular conductor C2 from the second holding part 12 will be described later.

In the following description, the position at which the opposed surfaces OS1 of the first upper holder 111 and the first lower holder 112 (the second upper holder 121 and the second lower holder 122) abut against each other will be referred to as a sandwiching position. In other words, the first upper holder 111 and the first lower holder 112 (the second upper holder 121 and the second lower holder 122) can move between the sandwiching position and the Y direction separated position.

Moreover, a sandwiching released position (in the Y direction) is present between the sandwiching position and the Y direction separated position as shown in FIG. 2C. The released position in the Y direction (hereinafter referred to as a Y direction released position) refers to a position at which the first upper holder 111 and the first lower holder 112 (the second upper holder 121 and the second lower holder 122) are separated away from each other by a smaller distance than the Y direction separated position.

Note that the Y direction released position in FIG. 2C can transition to the state shown in FIG. 2B by moving the first upper holder 111 and first lower holder 112 (the second upper holder 121 and the second lower holder 122) to the position at which the opposed surfaces OS1 thereof abut against each other.

Note that the positions of the first holding part 11 and the second holding part 12 along the X direction keep the X direction separated position in FIG. 2A.

Figure 3A:
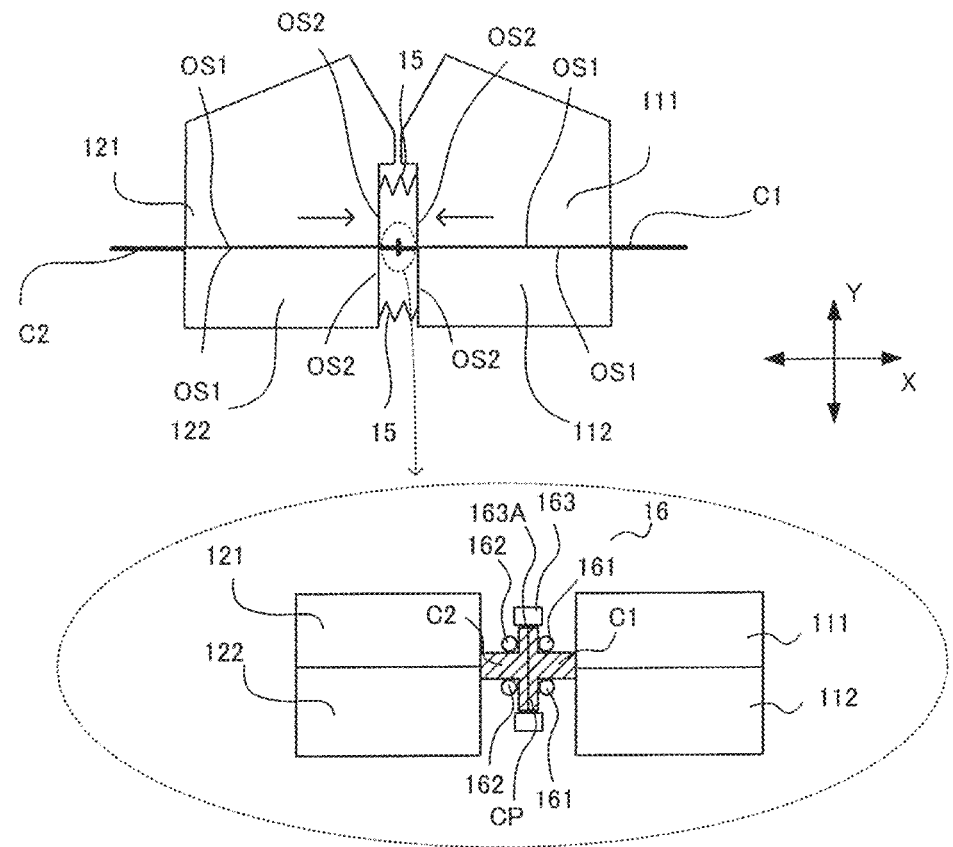
FIGS. 3A-3B include external views (front views) schematically illustrating the holding parts of the cold pressure welding apparatus according to the present embodiment.
Figure 3B:
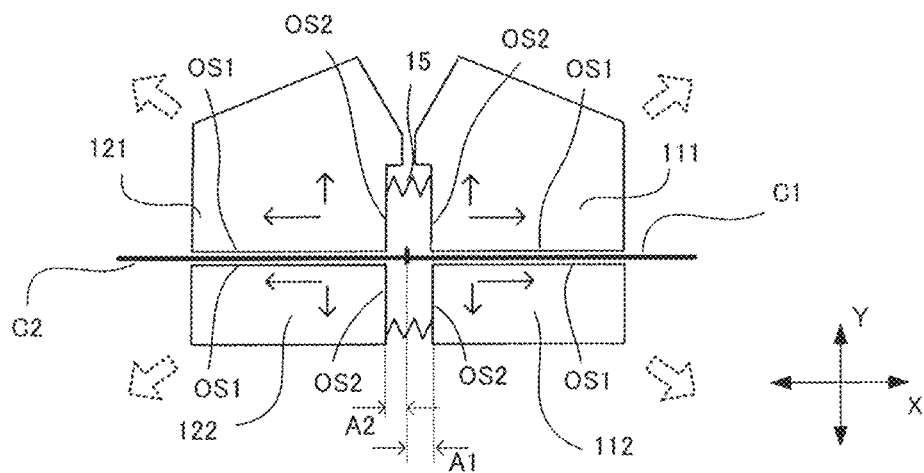

FIGS. 3A-3B include diagrams for mainly explaining the movement of the first holding part 11 and the second holding part 12 along the X direction. FIG. 3A shows a position resulting from moving the first holding part 11 and the second holding part 12 along the X direction from the state shown in FIG. 2B so that the opposed surfaces O52 are closest to each other. Hereinafter, such a position will be referred to as a close position. In other words, the first holding part 11 and the second holding part 12 can move between the X direction separated position shown in FIGS. 2A-2C and the close position shown in FIG. 3A. The first holding part 11 and the second holding part 12 never abut against each other even at the close position.

The first holding part 11 sandwiches the first rectangular conductor C1 so that the first rectangular conductor C1 projects by the projected amount A1, and the second holding part 12 sandwiches the second rectangular conductor C2 so that the second rectangular conductor C2 projects by the projected amount A2 (FIG. 2B). Thus, when the first holding part 11 and the second holding part 12 are at the close position, the first rectangular conductor C1 and the second rectangular conductor C2 are in a state abutted against (connected with) each other and further pressed against each other without causing the first holding part 11 and second holding part 12 to abut against each other. In other words, the projected amount A1 of the first rectangular conductor C1 from the first holding part 11 and the projected amount A2 of the second rectangular conductor C2 from the second holding part 12 are set to respective amounts slightly longer than lengths measured when the first rectangular conductor C1 and the second rectangular conductor C2 abut against each other with the first holding part 11 and the second holding part 12 being at the close position (amounts capable of being abutted and then pressed against each other).

Moreover, a pressing released position (in the X direction) is present between the close position and the X direction separated position (FIG. 2A) as shown in FIG. 3B. The released position in the X direction (hereinafter referred to as an X direction released position) refers to a position at which the first holding part 11 and the second holding part 12 are separated away from each other by a smaller distance than the X direction separated position. When the first holding part 11 and the second holding part 12 are at the X direction released position, the first upper holder 111 and the first lower holder 112 also move to the Y direction released position so as to separate from each other and the second upper holder 121 and the second lower holder 122 also move to the Y direction released position so as to separate from each other.

Note that the X direction released position in FIG. 3B can transition to the state shown in FIG. 3A.

Figure 4A:
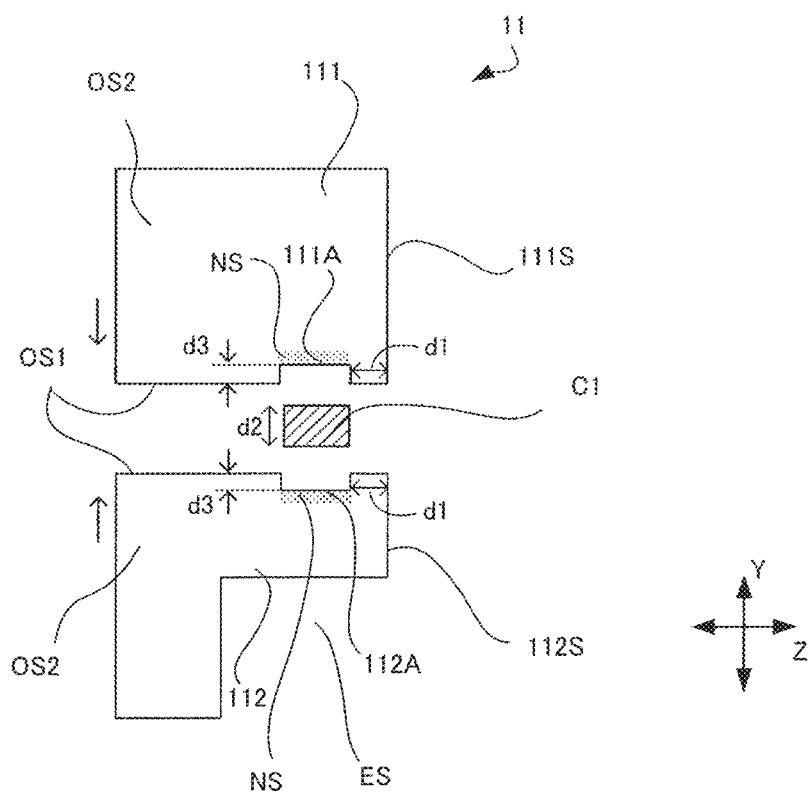
FIGS. 4A-4B include side views schematically illustrating the holding part of the cold pressure welding apparatus according to the present embodiment.
Figure 4B:
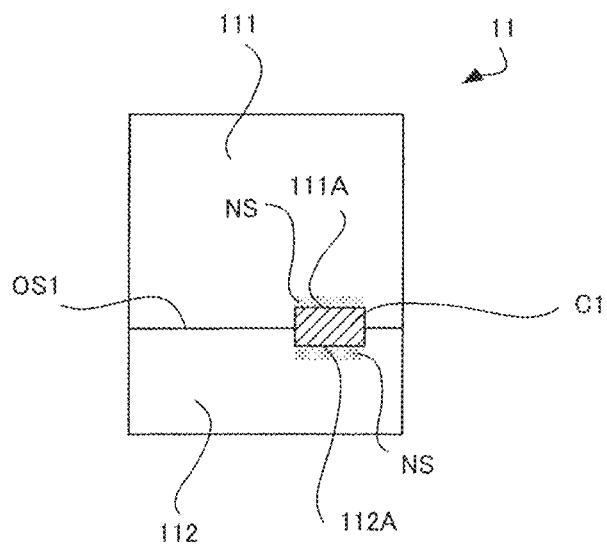

FIGS. 4A-4B includes side views (views on an arrow in the V direction of FIGS. 1A-1C) of the first holding part 11 when the opposed surfaces OS2 of the first holding part 11 are viewed from the second holding part 12 side. FIG. 4A shows a state in which the first upper holder 111 and the first lower holder 112 are at the Y direction separated position (the state of FIG. 2A); and FIG. 4B shows a state in which the first upper holder 111 and the first lower holder 112 are at the sandwiching position the (state of FIG. 2B).

The first upper holder 111 includes a rectangular conductor holding groove 111A provided at a position close to one end face (the right end face in the FIG. 111S in a third direction (a strip width direction of the rectangular conductor; a Z direction in FIG. 4A). The first lower holder 112 includes a rectangular conductor holding groove 112A provided at a position close to one end face (the right end face in the figure) 112S in the third direction (hereinafter referred to as the Z direction). The third direction (Z direction) is a direction different from the X direction and the Y direction and herein defined as a direction perpendicular to the X and Y directions.

The one end face 111S of the first upper holder 111 and the one end face 112S of the first lower holder 112 lie on the same plane. The one end face in the third direction (Z direction) refers to the front faces of the first upper holder 111 and the first lower holder 112 in FIG. 1A and the end faces closer to an operator.

The rectangular conductor holding grooves 111A and 112A are rectangular grooves provided at positions distant inwardly from the end faces 111S and 112S of the first upper holder 111 and the first lower holder 112 by a distance d1 in the third direction (Z direction) and provided on the opposed surfaces OS1 of the first upper holder 111 and the first lower holder 112.

Although the details will be described later, the rectangular conductor holding grooves 111A and 112A need to hold (sandwich) the rectangular conductor reliably. Thus, their shapes are in conformity with the outer shape of the rectangular conductor, and a depth d3 of each groove is a depth smaller than or equal to a half of a thickness d2 of the sandwiched rectangular conductor (in this case, the first rectangular conductor C1). Specifically, the depth of each of the rectangular conductor holding grooves 111A and 112A is smaller than the half of the thickness d2 of the rectangular conductor by about 5/100 mm.

As shown in FIG. 4B, when the opposed surfaces OS1 of the first upper holder 111 and the first lower holder 112 abut against each other (when being at the sandwiching position (FIG. 2B)), the rectangular conductor holding grooves 111A and 112A form a single hole in a shape of a rectangular column, which passes through the first holding part 11 in the X direction. In such a hole, the rectangular conductor (first rectangular conductor C1) is in close contact with the rectangular conductor holding grooves 111A and 112A while being compressed in the direction of the plate thickness d2 (having a reduced plate thickness) and thereby sandwiched by the first holding part 11 (the first upper holder 111 and the first lower holder 112).

Furthermore, the rectangular conductor holding grooves 111A and 112A each include an anti-slip finished surface NS in order to sandwich (hold) the rectangular conductor reliably. The anti-slip finished surface NS is a surface with high frictional resistance or a high adsorptive surface, for example. Specifically, the anti-slip finished surface NS may be, for example, a surface with increased frictional resistance due to fine uneven finish by sandblasting, for example, or a finished surface with projections and depressions in a shape of what is called a saw blade, which are formed so that frictional resistance in one direction becomes higher than frictional resistance in the other direction. Alternatively, the anti-slip finished surface NS may be a surface with increased adsorption force due to the creation of a vacuum state, or a surface with increased adsorption force due to vacuum pressure caused by mirror finish or atomic force. If the degree of the uneven finish is large, there is a risk of causing a non-uniform electric field (corona discharge) and thus damaging coating and the like when coils are manufactured, for example. Therefore, the degree of fine uneven finish that can be obtained by sandblasting is preferred. The anti-slip finished surface is formed to have a 10% thickness (depth) of the plate thickness.

Although the diagrammatic illustration is omitted here, the same applies to the second holding part 12. The second upper holder 121 includes a rectangular conductor holding groove 121A provided at a position close to one end face (front face closer to an operator) in the third direction (the Z direction). The second upper holder 122 includes a rectangular conductor holding groove 122A provided at a position close to one end face in the third direction. The configurations of the rectangular conductor holding grooves 121A and 122A are similar to those of the rectangular conductor holding grooves 111A and 112A in the first holding part 11.

The drive part 13 moves the first holding part 11 and the second holding part 12 along the X direction between the X direction separated position and the close position via the drive transmission part (not shown) in accordance with an instruction from the control part 14. The drive transmission part may be configured, for example, by a linear guide, a cam mechanism, or an appropriate structure constructed by a rack and a pinion, for example. The drive part 13 also moves the first upper holder 111 and the first lower holder 112 along the Y direction between the sandwiching position and the Y direction separated position via the drive transmission part (not shown) in accordance with an instruction from the control part 14, and moves the second upper holder 121 and the second lower holder 122 between the sandwiching position and the Y direction separated position.

Thus, the drive part 13 can control the first holding part 11 and the second holding part 12 to be in any one of a sandwiching state, a pressure welding state, a pressure welding released state, a retracted state, and a transition state between two of these states.

Referring back to FIGS. 2A-2C and 3A-3B, for the sandwiching state, the first upper holder 111 and the first lower holder 112 in the first holding part 11 are moved along the Y direction from the Y direction separated position (FIG.

2A) to the sandwiching position (FIG. 2B) to cause the first upper holder 111 and the first lower holder 112 to sandwich the first rectangular conductor C1. The second upper holder 121 and the second lower holder 122 in the second holding part 12 are also moved along the Y direction from the Y direction separated position (FIG. 2A) to the sandwiching position (FIG. 2B) to cause the second upper holder 121 and the second lower holder 122 to sandwich the second rectangular conductor C2.

As described above, the first holding part 11 sandwiches the first rectangular conductor C1 so that the first rectangular conductor C1 projects in the direction of the second holding part 12 from the opposed surfaces OS2 along the Y direction by the projected amount A1. The second holding part 12 sandwiches the second rectangular conductor C2 so that the second rectangular conductor C2 projects in the direction of the first holding part 11 from the opposed surfaces OS2 along the Y direction by the projected amount A2.

At this time, the pressing parts 18 (see FIG. 1A) press the first upper holder 111 and the first lower holder 112 so that these holders abut against each other and press the second upper holder 121 and the second lower holder 122 so that these holders abut against each other. Consequently, the first rectangular conductor C1 and the second rectangular conductor C2 are brought into close contact with the rectangular conductor holding grooves 111A, 112A, 121A and 122A while being compressed in the plate thickness direction (having a reduced plate thickness) and thereby sandwiched by the first holding part 11 and the second holding part 12 (see FIGS. 4A-4B).

Alternatively, for the sandwiching state, the first upper holder 111 and the first lower holder 112 in the first holding part 11, which are at the Y direction released position (FIG. 2C), may be moved to the sandwiching position (FIG. 2B) to cause the first upper holder 111 and the first lower holder 112 to sandwich the first rectangular conductor C1. Simultaneously, the second upper holder 121 and the second lower holder 122 in the second holding part 12, which are at the Y direction released position (FIG. 2C), may be moved to the sandwiching position (FIG. 2B) to cause the second upper holder 121 and the second lower holder 122 to sandwich the second rectangular conductor C2.

At this time, the pressing parts 18 also press the first upper holder 111 and the first lower holder 112 so that these holders abut against each other and press the second upper holder 121 and the second lower holder 122 so that these holders abut against each other. Consequently, the first rectangular conductor C1 and the second rectangular conductor C2 are brought into close contact with the rectangular conductor holding grooves 111A, 112A, 121A and 122A while being compressed in the plate thickness direction (having a reduced plate thickness) and thereby sandwiched by the first holding part 11 and the second holding part 12 (see FIGS. 4A-4B).

For the pressure welding state, the first holding part 11 and the second holding part 12 in the sandwiching state are moved along the X direction from the X direction separated position (FIG. 2A) to the close position (FIG. 3A) against the biasing force from the biasing members 15. At this time, the first rectangular conductor C1 projects from the first holding part 11 and the second rectangular conductor C2 projects from the second holding part 12. These projected amounts A1 and A2 are amounts slightly longer than lengths measured when opposing end faces in the strip longitudinal direction abut against each other with the first holding part 11 and the second holding part 12 being at the close position (FIG. 3A). Specifically, the opposing end faces of the first rectangular conductor C1 and the second rectangular conductor C2 first come into contact with (abut against) each other before (just before) moving to the close position. Thereafter, the first holding part 11 and the second holding part 12 are moved to the close position (FIG. 3A) by the drive part 13. This causes the abutting end faces of the first rectangular conductor C1 and the second rectangular conductor C2 to be butted and pressed against each other, and thus welded together. More specifically, by causing the end faces of the first rectangular conductor C1 and the second rectangular conductor C2 to be pressed against each other, stable oxide films formed on the end faces are removed, and such end faces are plastically deformed to expose surfaces in an active state. The faces in the active state are made close to each other with an interval therebetween smaller than or equal to 10 angstrom to cause atomic binding between those metals. In this manner, cold pressure welding is performed. In other words, the first rectangular conductor C1 and the second rectangular conductor C2 after the pressure welding have compressed (shortened) lengths in the strip longitudinal direction by means of the cold pressure welding as compared to before the pressure welding. The shortened amounts are equal in the first rectangular conductor C1 and the second rectangular conductor C2. More specifically, where the length of the first rectangular conductor C1 before the pressure welding is defined as L01 and the length of the second rectangular conductor C2 before the pressure welding is defined as L02, the length of the first rectangular conductor C1 is shortened to L01' and the length of the second rectangular conductor C2 is shortened to L02' due to the pressure welding. The shortened amounts S are equal to each other (S=L01−L01'=L02−L02').

The first holding part 11 and the second holding part 12 never come closer to each other after these parts are moved to the close position. Thus, the end faces of the first rectangular conductor C1 and the second rectangular conductor C2 are stopped from further being pressed against each other.

For the pressure welding state, the first upper holder 111 and the first lower holder 112, and the second upper holder 121 and the second lower holder 122 at the Y direction released position (FIG. 2C) or at the Y direction released position and the X direction released position (FIG. 3B) are moved to the sandwiching position (FIG. 2B). The first holding part 11 and the second holding part 12 are then moved to the close position against the biasing force from the biasing members 15. Consequently, the end faces of the first rectangular conductor C1 and the second rectangular conductor C2 are butted and pressed against each other, and thus cold pressure welded together (FIG. 3A).

For the pressure welding released state, the first holding part 11 and the second holding part 12 in the pressure welding state are controlled to move in a direction in which they are separated away from each other along the X direction so as to move to the X direction released position. Additionally, the first upper holder 111 and the first lower holder 112 are controlled to move in a direction in which they are separated away from each other along the Y direction so as to move to a first Y direction released position. Also, the second upper holder 121 and the second lower holder 122 are controlled to move in a direction in which they are separated away from each other along the Y direction so as to move to a second Y direction released position (FIG. 3B).

In the pressure welding state, the first holding part 11 and the second holding part 12 finally reach the close position, thus stopping the first rectangular conductor C1 and the second rectangular conductor C2 from further being pressed against each other. Therefore, the first holding part 11 and the second holding part 12 perform the sandwiching of the first rectangular conductor C1 and the second rectangular conductor C2 again by transitioning to the sandwiching state from the pressure welding state via the pressure welding released state in order to repeat the pressing step.

Here, when the pressure welding state is changed to the pressure welding released state (when the pressure welding is released), the biasing members 15 exert the biasing force in the direction in which the first upper holder 111 and the first lower holder 112 (the same applies to the second upper holder 121 and the second lower holder 122) are separated away from each other. However, little clearance exists between the rectangular conductor holding grooves 111A, 112A, 121A, and 122A and the first and second rectangular conductors C1 and C2 as shown in FIGS. 4A-4B. Moreover, part of the metal fluidized by the plastic deformation of the metal due to the pressing (expanded welded surfaces) goes into very small clearance of the rectangular conductor holding grooves 111A, 112A, 121A, and 122A (such as the corners of the grooves, for example), thereby increasing the degree of adhesion. Therefore, the biasing force only from the biasing members 15 may fail to separate the first upper holder 111 and the first lower holder 112 (the same applies to the second upper holder 121 and the second lower holder 122).

In view of this, the present embodiment is configured so that in the pressure welding released state (FIG. 3B), the first holding part (the first upper holder 111 and the first lower holder 112) is moved in a direction away from the second holding part 12 along the X direction via the drive transmission part so as to return to a first X direction released position and the second holding part (the second upper holder 121 and the second lower holder 122) is moved in a direction away from the first holding part 11 along the X direction via the drive transmission part so as to return to a second X direction released position in addition to the biasing force from the biasing members 15.

Even when the first holding part 11 and the second holding part 12 are forcibly moved in the direction in which they are separated away from each other in addition to the biasing members 15, the movement restraining units 17 restrain the movement of the first rectangular conductor C1 and the second rectangular conductor C2 in the direction in which they are separated away from each other along the X direction.

For the retracted state, the first holding part 11 and the second holding part 12 in the pressure welding state, the pressure welding released state, or the sandwiching state are controlled so as to move along the X direction to the X direction separated position. Also, the first upper holder 111 and the first lower holder 112 are moved along the Y direction so as to move to the Y direction separated position and the second upper holder 121 and the second lower holder 122 are moved along the Y direction so as to move to the Y direction separated position (FIG. 2A).

The cold pressure welding apparatus 10 can achieve the cold pressure welding of the rectangular conductors by a one-time pressing step. In order to stabilize the welded surfaces, however, it is desirable that the pressing step be repeated a plurality of times for one welding portion. As one example, a one-time pressing amount (compressed amount) by the cold pressure welding apparatus 10 is about 0.5 mm for both of the first rectangular conductor C1 and the second rectangular conductor C2. The pressing (cold pressure welding) step is repeated three or four times for one welding portion, thereby compressing the rectangular conductor by about 1 mm or more (preferably 1.5 mm or more, specifically about 2 mm). In this manner, stable welded surfaces can be obtained.

Thus, the cold pressure welding apparatus 10 of the present embodiment performs the cold pressure welding of the first rectangular conductor C1 and the second rectangular conductor C2 by repeating the sandwiching state, the pressure welding state, and the pressure welding released state.

As shown in FIG. 3A, when the first holding part 11 and the second holding part 12 transition to the pressure welding state after the sandwiching state, the first holding part 11 and the second holding part 12 are moved to the close position. Consequently, the end faces of the first rectangular conductor C1 and the second rectangular conductor C2 come into contact with (abut against) each other, and then the end faces are pressed against each other and thus cold pressure welded together. The first holding part 11 and the second holding part 12 at the close position never come closer to each other. Thus, by once transitioning to the pressure welding released state (FIG. 3B), the first holding part 11 and the second holding part 12 are moved to the Y direction released position so as to release the sandwiching of the rectangular conductors and the first holding part 11 and the second holding part are moved to the X direction released position. Thereafter, by transitioning to the sandwiching state, the first holding part 11 holds the first rectangular conductor C1 so that the predetermined projected amount A1 is projected and the second holding part 12 holds the second rectangular conductor C2 so that the projected amount A2 is projected. The sandwiching state then transitions to the pressure welding state again. In this manner, the pressing step can be repeated a plurality of times for one welding portion.

In other words, the X direction released position refers to a position allowing that the first holding part 11 can sandwich the first rectangular conductor C1 with the first rectangular conductor C1 projected by the projected amount A1 and a position allowing that the second holding part 12 can sandwich the second rectangular conductor C2 with the second rectangular conductor C2 projected by the projected amount A2.

Note that the X direction released position may not correspond to the positions that will cause the rectangular conductors to project by the projected amounts A1 and A2 when subsequently transitioning to the sandwiching state (without changing the positions). In such a case, the rectangular conductors may be sandwiched after the first holding part 11 and the second holding part 12 are moved to the positions that will cause the rectangular conductors to project by the projected amounts A1 and A2, respectively, in the sandwiching state.

As shown in FIG. 3A, the cold pressure welding apparatus 10 may further include, in addition to the movement restraining units 17, another movement restraining unit (fixing member 16) for restraining the first rectangular conductor C1 and the second rectangular conductor C2 from moving in the direction in which they are separated away from each other along the X direction and restraining the first rectangular conductor C1 and the second rectangular conductor C2 from moving along the Y direction.

As shown in FIG. 3A, the fixing member 16 includes, as one example, two pairs of cylindrical projections 161 and 162 with an interval therebetween slightly larger than the plate thickness of non-plastically-deformed portions of the first rectangular conductor C1 and the second rectangular conductor C2 and smaller than the length of a welded portion CP in the plate thickness direction; and projections (or plates) 163 (each having a shape of a rectangular column, for example) having a pair of restraining surfaces 163A provided lateral to the both ends of the welded portion in the plate thickness direction.

Even when the first rectangular conductor C1 and the second rectangular conductor C2 are in close contact with the rectangular conductor holding grooves 111A, 112A, 121A, and 122A while the first holding part 11 and the second holding part 12 are moved by the drive part 13 to the Y direction released position and the X direction released position or to the Y direction separated position and the X direction separated position in the compression released state (FIG. 3B) or in the retracted state (FIG. 2A), the fixing member 16 restrains the movement of the first rectangular conductor C1 and the second rectangular conductor C2. Specifically, the cylindrical projections 161 restrain the movement of the first rectangular conductor C1 in the direction separated away from the second rectangular conductor C2 (the right direction in the figure) along the X direction. The projections 162 restrain the movement of the second rectangular conductor C2 in the direction separated away from the first rectangular conductor C1 (the left direction in the figure) along the X direction. The projections 163 having the restraining surfaces 163A restrain the first rectangular conductor C1 and the second rectangular conductor C2 from moving in an upper direction or in a lower direction in the figure along the Y direction.

In this manner, the first rectangular conductor C1 and the second rectangular conductor C2 can maintain the positions immediately after the pressure welding, thus increasing the stability of the welded surface. Therefore, the welded portion CP can be prevented from separating after the pressure welding along with the first holding part 11 and the second holding part 12.

Note that the fixing member 16 may be a rubber pressing member, for example, without being limited to the projections or the plates.

The above-described embodiment has been described with, as one example, the configuration in which the first holding part 11 and the second holding part 12 stop at the X direction released position and the Y direction released position in the pressure welding released state. However, the first holding part 11 and the second holding part 12 may not stop at the X direction released position and the Y direction released position, although these parts pass through such positions. In other words, the first upper holder 111 and the first lower holder 112 (the same applies to the second upper holder 121 and the second lower holder 122) may move among the sandwiching position, the Y direction released position, and the Y direction separated position without stopping, and the first holding part 11 and the second holding part 12 may move among the close position, the X direction released position, and the X direction separated position without stopping.

The cold pressure welding has been employed in the conventional art to weld round wires. According to the cold pressure welding apparatus 10 of the above-described present embodiment, however, the cold pressure welding of rectangular conductors can be performed excellently and stably.

By employing coil pieces as the rectangular conductors (the first rectangular conductor C1 and the second rectangular conductor C2), the cold pressure welding apparatus 10 can be used as a coil manufacturing apparatus 20. This will be described below.

With reference to FIGS. 5A-5E, a rectangular conductor C used in the coil manufacturing apparatus 20 of the present embodiment will be described first. FIGS. 5A-5E include top views illustrating wider surfaces WS of the rectangular conductors C. The rectangular conductor C has a linear shape (FIG. 5A) or at least one bent portion (FIGS. 5B to 5E). The rectangular conductors C are a plurality of strip-shaped rectangular conductors capable of having a helical shape when continuously joined together. These will be hereinafter referred to as coil pieces. Coil pieces having bent portions are bent in the same direction in the strip longitudinal direction so that such coil pieces have a helical shape when continuously joined together. Moreover, for coil pieces having bent portions, it is desirable that such bent portions preferably have at least one non-curved (for example, generally right-angle) shape.

In the following description, note that a helical structure, formed by continuously joining (connecting) a plurality of coil pieces (rectangular conductors) together, in a state before being finished as a coil (helical structure to be finally obtained) is also referred to as a coil piece. In other words, the coil pieces (rectangular conductors) in the following description include: a coil piece as the smallest unit, which has a linear shape or one to four bent portion(s) in the same direction(s) in the strip longitudinal directions; and a coil piece formed by connecting a plurality of the coil pieces as the smallest unit to form a helical structure having one or more turns of a coil (helical structure to be finally obtained). When these need to be distinguished from one another for ease of explanation, the coil piece as the smallest unit will be referred to as a unit coil piece; a coil piece, which is formed by connecting a plurality of unit coil pieces together, in a state before being finally obtained as a coil (helical structure to be finally obtained) will be referred to as a welded coil piece; and a helical structure to be finally obtained (in a finished state) will be referred to as a coil. The plurality of coil pieces have approximately the same shapes and areas of their cross sections perpendicular to the strip longitudinal direction.

Figure 5A:
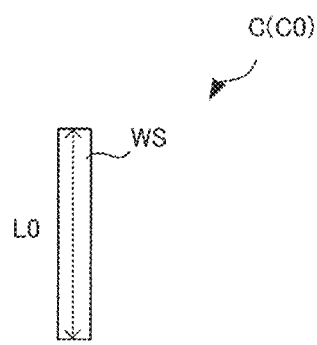
FIGS. 5A-5E include top views showing rectangular conductors according to the present embodiment.
Figure 5B:
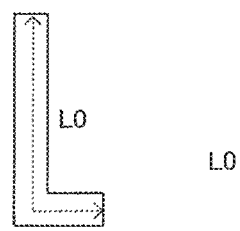
Figure 5C:
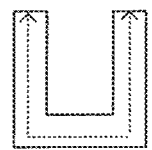
Figure 5D:
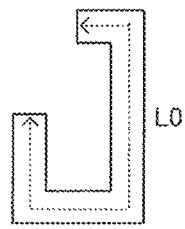
Figure 5E:
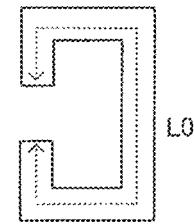

As shown in FIGS. 5A-5C, a unit coil piece C0 is formed, as one example, in a shape having a linear shape or a generally right-angle non-curved bent portion (corner portion) by the punching of a copper plate (for example, a thickness of 1 mm). More specifically, the unit coil piece C0, when the wider surface WS thereof is viewed from the above, has a straight line shape with no bent portions (I-shape) (FIG. 5A), an L-shape with a single bent portion (FIG. 5B), a U-shape (a shape of Japanese katakana "ko") having two bent portions (FIG. 5C), a generally C-shape having three bent portions (FIG. 5D), or a C-shape (generally O-shape (generally a shape of Japanese katakana "ro")) having four bent portions and bent in the same direction (FIG. 5E). Although the U-shape, the (generally) C-shape, and the generally O-shape are used in the following description, the bent portions (corner portions) thereof all have generally right-angle shapes.

A plurality of coil pieces (unit coil pieces and/or welded coil pieces) are configured such that a prepared length L0, which is equal to the total distance of the coil pieces in the strip longitudinal direction, is longer than a finished length of the helical structure to be finally obtained (coil) in a helical longitudinal direction by a margin. The margin is set to a total shortened distance corresponding to an amount shortened by pressing when all of the plurality of coil pieces are cold pressure welded. The prepared length L0, the finished length, the margin, and the total shortened distance will be described in detail in the description of a coil manufacturing method to be described later.

Since the coil manufacturing apparatus 20 of the present embodiment is an application example of the above-described cold pressure welding apparatus 10, the same structures as those of the cold pressure welding apparatus 10 will be denoted by the same reference numerals and redundant description will be omitted. Structures preferably used in the coil manufacturing apparatus 20 will be mainly described in the following description.

Referring back to FIGS. 1A-1C, the coil manufacturing apparatus 20 includes: a first holding part 11 and a second holding part 12 capable of sandwiching a rectangular conductor and another rectangular conductor, respectively, and disposed opposite to each other; and a drive part 13 for moving the first holding part 11 and the second holding part 12. The coil manufacturing apparatus 20 is an apparatus for forming a helical structure to be a coil by connecting a plurality of strip-shaped rectangular conductors (coil pieces) capable of having a helical shape when continuously joined together. The prepared length, corresponding to the total distance of the plurality of rectangular conductors (coil pieces) in the strip longitudinal direction, is set to be longer than the finished length of the helical structure to be finally obtained in the helical longitudinal direction by the margin. The end faces of the plurality of rectangular conductors (coil pieces) are cold pressure welded together while being pressed against each other along the strip longitudinal direction and thus shortening their distances in the strip longitudinal direction. The total shortened distance, corresponding to the amount shortened by cold pressure welding all of the plurality of rectangular conductors (coil pieces) together, is set to the margin. In this manner, the coil manufacturing apparatus 20 forms the helical structure.

In other words, according to the coil manufacturing apparatus of the present embodiment, as the number of times for the addition of a coil piece (the number of times for welding) increases, the length of the coil piece (welded coil piece) held by the first holding part 11 or the second holding part 12 increases. The first holding part 11 and the second holding part 12 thus have a configuration preferably used when manufacturing coils.

Figure 6A:
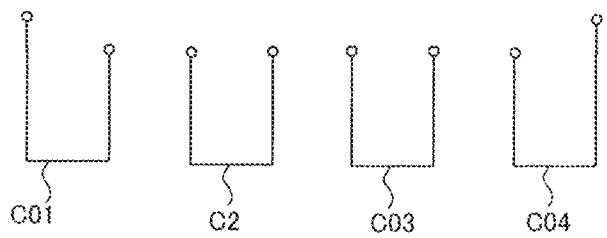
FIGS. 6A-6E include schematic diagrams illustrating a way of cold pressure welding rectangular conductors according to the present embodiment.
Figure 6B:
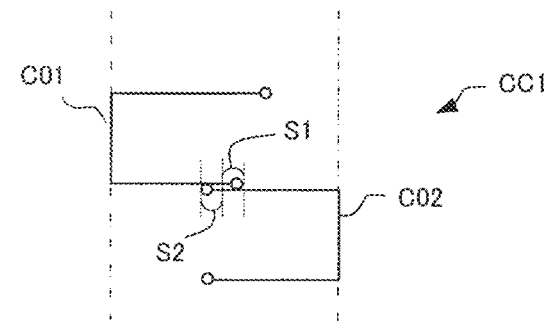
Figure 6C:
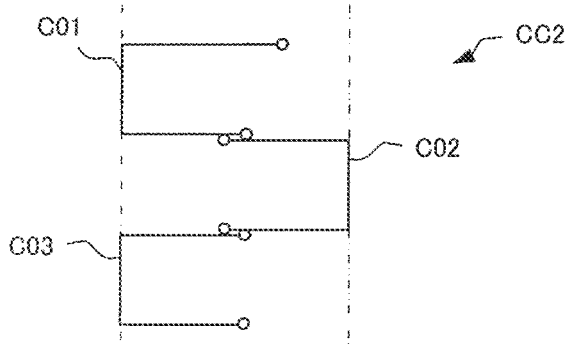
Figure 6D:
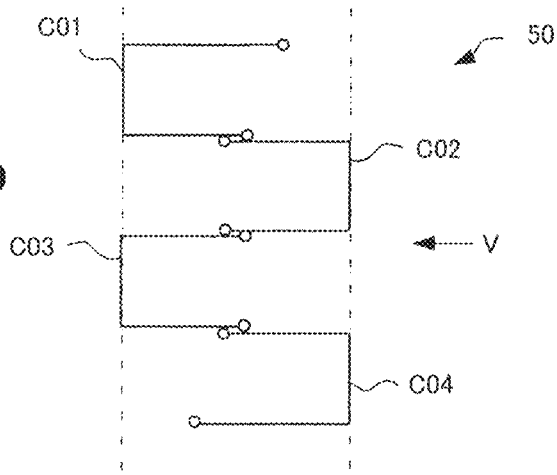
Figure 6E:
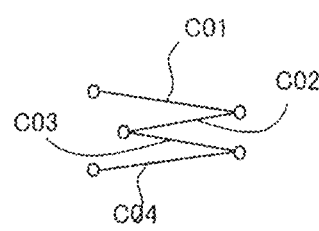

First, FIGS. 6A-6E includes schematic diagrams illustrating coil pieces during manufacture by the coil manufacturing apparatus 20. FIG. 6A is a schematic diagram (top view) illustrating prepared unit coil pieces. FIGS. 6B to 6D are development views illustrating the unit coil pieces and welded coil pieces during manufacture. FIG. 6E is a view on an arrow in the V direction of FIG. 6D.

Here, a case where a plurality of (four in this case) U-shaped (Japanese katakana "ko"-shaped) unit coil pieces C0 having two bent portions are prepared and these unit coil pieces are connected (continuously joined) together to manufacture a coil (helical structure) 50 in a helical shape of two turns is shown by way of example. Chain double-dashed lines at both ends of the coil pieces in FIGS. 6B to 6D indicate the finished ends of finished coils. This example will be described assuming that no finished ends change (the positions of the finished ends do not move in the right or left direction in the figure).

First, one end faces (indicated by circles) of two unit coil pieces C01 and C02 are connected together to form a welded coil piece CC1 as shown in FIG. 6B in the first cold pressure welding. Thereafter, in the next cold pressure welding, one end face of the welded coil piece CC1 (either one of the non-welded end faces of the unit coil pieces C01 and C02) is cold pressure welded with a unit coil piece C03 to form a welded coil piece CC2 (FIG. 6C). In the further subsequent cold pressure welding, one end face of the welded coil piece CC2 (any one of the non-welded end faces of the unit coil pieces C01 or C03) is cold pressure welded with a unit coil piece C04 to finish the coil 50 (FIG. 6D).

In other words, the first holding part 11 or the second holding part 12 holds a bent (in this case, U-shaped (Japanese katakana "ko"-shaped)) coil piece, and the welded coil piece CC1, CC2 . . . having a sequentially lengthened helical structure is present near the first holding part 11 or the second holding part 12. The first holding part 11 and the second holding part 12 thus need to have a configuration to avoid interference with such a coil piece.

Figure 7A:
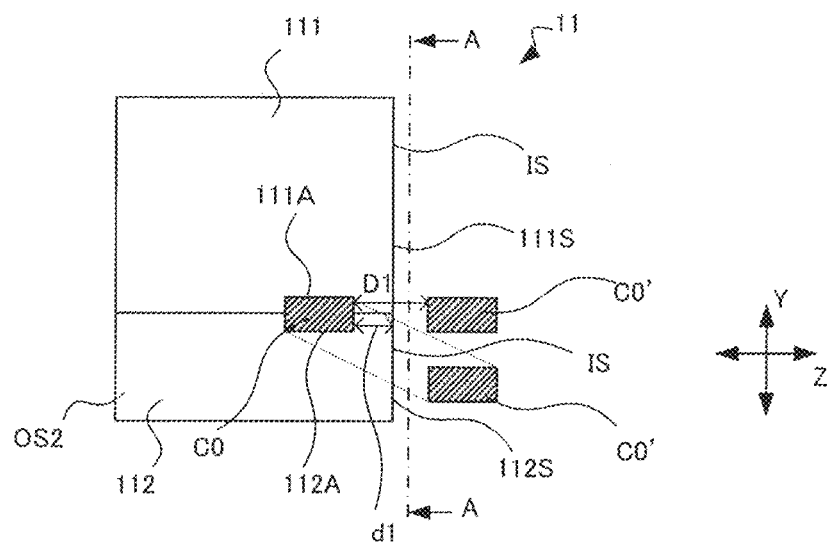
FIGS. 7A-7C include diagrams illustrating a coil manufacturing apparatus according to the present embodiment.
Figure 7B:
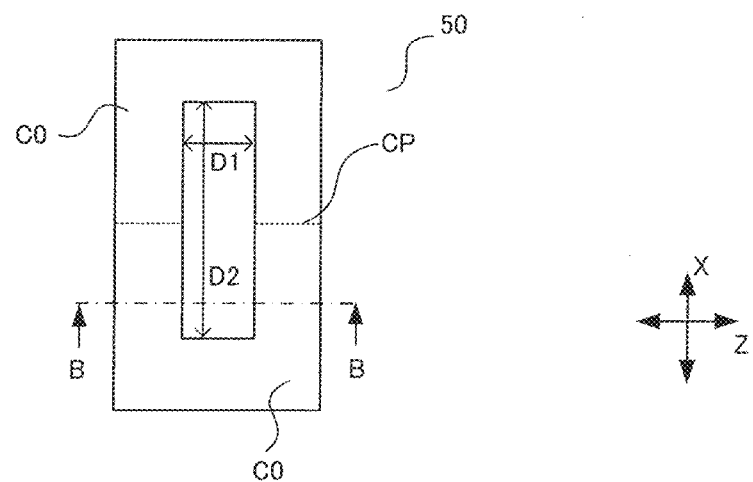
Figure 7C:
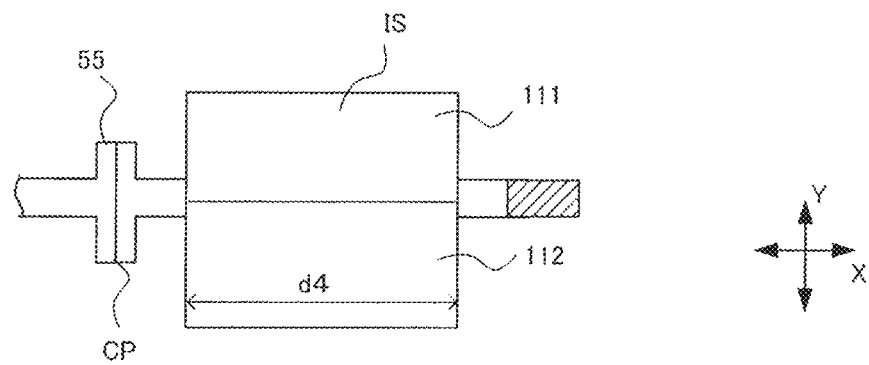

FIGS. 7A-7C includes diagrams for explaining a configuration of the first holding part 11. FIG. 7A is a diagram showing a state in which the single unit coil piece C0 is held by the first holding part 11 (a first upper holder 111 and a first lower holder 112) when opposed surfaces OS2 with respect to the second holding part 12 are viewed from the front. FIG. 7B is a front view of the finished coil 50 as viewed from the direction of the axial center of its helical structure. The coil piece in FIG. 7A corresponds to a cross-sectional view taken along line B-B in FIG. 7B. Although only the first holding part 11 is described here, the same applies to the second holding part 12. FIG. 7C is a front view (a cross-sectional view taken along line A-A in FIG. 7A) of the first holding part 11.

When a coil piece has two or more bent portions (for example, in the case of a U-shaped (Japanese katakana "ko"-shaped) coil piece) as shown in FIGS. 7A and 7B, the first holding part 11 may possibly interface with a portion excluding the coil piece being welded (in FIG. 7A, a coil piece C0' making a U-turn from the coil piece C0 held by the first holding part 11 and extending toward the front side). In order to avoid this, the dimensions of the first holding part 11 and the coil piece (finally-obtained coil 50) are set to satisfy the following relationships in the present embodiment.

More specifically, when U-shaped (Japanese katakana "ko"-shaped) coil pieces are connected together, one end face of the first holding part 11, specifically, a holder end face that is configured by one end face 111S of the first upper holder 111 and one end face 112S of the first lower holder 112, which is coplanar with the end face 111S, and that is perpendicular to the opposed surfaces OS2, is positioned in the internal space of the helical structure (including a space to be the internal space of the helical structure) (hereinafter, such an end face will be referred to as a helix internal end face IS). Note that the helix internal end face IS refers to the front face of the first holding part 11 closer to an operator, for example.

Therefore, rectangular conductor holding grooves 111A and 112A in the first holding part 11 need to be provided at appropriate positions in order to avoid the interference between the first holding part 11 and the coil piece. A distance d1 from the helix internal end face IS to the closest end of the rectangular conductor holding grooves 111A and 112A (the upper end in FIG. 7A) is defined to be smaller than a distance D1 of the internal space of the helical structure (coil 50) along a third direction (a Z direction in the figure: the strip width direction of the coil piece to be cold pressure welded).

Also, a length d4 (FIG. 7C) in the X direction of the first holding part 11 is defined to be smaller than a distance D2 (FIG. 7B) in the internal space of the helical structure (coil 50) along the X direction.

Note that a burr 55 is generated in the connected portion due to the pressing when two coil pieces are cold pressure welded together. Thus, the coil piece (welded coil piece) is removed from the first holding part 11 and the second holding part 12 to eliminate the burr after the completion of the cold pressure welding. Thereafter, such a coil piece (welded coil piece) is cold pressure welded with another (new) coil piece.

FIG. 8 is a diagram corresponding to (viewed from the same direction) FIG. 7A and showing a state in which a welded coil piece CC is formed. In the coil manufacturing apparatus 20 of the present embodiment, the welded coil piece CC is formed on one side of the first holding part 11 (the same applies to the second holding part 12), i.e., on the first lower holder 112 side in this case.

Since the rectangular conductor holding grooves 111A and 112A in the first holding part 11 are linear grooves along the X direction, only part of the linear portion of the welded coil piece CC including one end face thereof is held by the first holding part 11 during the cold pressure welding. Thus, in order to avoid the interference between the welded coil piece CC and the first holding part 11 (the first lower holder 112), the coil piece (in this case, the welded coil piece CC) is cold pressure welded with the coil piece held by the second holding part 12 while elastically deforming and/or plastically deforming a portion of the coil piece excluding the vicinity of the end face to be cold pressure welded so as to expand in the helical traveling direction (direction along the Y direction) of the helical structure.

A deformed amount D3 of the elastic deformation and/or plastic deformation of the coil piece (in this case, the welded coil piece CC) in the helical traveling direction is set to an amount to avoid the interference between the first holding part 11 and the coil piece. In other words, a length (thickness) d5, along the Y direction, of the holder of the first holding part 11 on the side where the welded coil piece is being formed (in this case, the first lower holder 112) is defined to be smaller than the deformed amount D3 allowed for the elastic deformation and/or plastic deformation of the coil piece (in this case, the welded coil piece CC) in the helical traveling direction.

Here, the first lower holder 112 is provided with an interference avoidance space ES (see also FIGS. 4A-4B) on the front side in the helical traveling direction of the helical structure (in this case, on the lower side in the thickness direction of the coil piece being welded; on the front side in the Z direction (operator's side)). The interference avoidance space ES is a space capable of accommodating part of the welded coil piece CC. The provision of the interference avoidance space ES allows for the avoidance of the interference between part of the welded coil piece CC being connected and the holding part (in this case, the first lower holder 112). Although the first lower holder 112 has an L-shape as viewed from the side thereof in FIGS. 8 and 4A, the first lower holder 112 may have a flat plate shape with the thickness d5 (see FIG. 8). In such a case, a space under the first lower holder 112 serves as the interference avoidance space ES.

As described above, the coil manufacturing apparatus 20 of the present embodiment forms a helical structure by connecting coil pieces together by means of the cold pressure welding while elastically deforming and/or plastically deforming the coil pieces in the helical traveling direction (the direction along the Y direction). Thus, the coil pieces are connected (added) together while being expanded in the helical traveling direction during the manufacture of the helical structure. However, after the finished helical structure is obtained, the helical structure is integrally shaped (for example, pressed) to obtain the coil 50 having helical turns in close contact with one another by being subjected to the elastic deformation and/or plastic deformation for compressing the helical structure in the helical traveling direction.

The coil manufacturing apparatus 20 of the present embodiment manufactures a coil with a desired length L by employing coil pieces, which are lengthened by a compressed amount (contracted amount) (lengthened by a margin) due to the cold pressure welding, on the basis of the finished length of the coil and adding the coil pieces while repeating the compression (contraction) thereof by the cold pressure welding.

Thus, on the occasion of the cold pressure welding, the cold pressure welding is performed while measuring the distance of the coil piece in the strip longitudinal direction. In order to measure such a distance in the strip longitudinal direction, a sliding detection mechanism (not shown) is provided in the first holding part 11 and the second holding part 12 (or the vicinity thereof), for example. This can detect the sliding of the coil piece (first coil piece) held by the first holding part 11 and the coil piece (second coil piece) held by the second holding part 12 when pressed against each other, thereby measuring the distances of these coil pieces in the strip longitudinal direction. Such a distance in the strip longitudinal direction may be measured simultaneously (on a real-time basis) with the cold pressure welding or measured before and after the cold pressure welding (or before or after the cold pressure welding). This can yield highly-accurate dimensions of the finished coil.

As shown in FIG. 7B, the generally right-angle bent portions of the coil piece become the corner portions of the coil 50. In other words, the coil manufacturing apparatus 20 of the present embodiment can manufacture the coil 50 having generally right-angle inner peripheral and outer peripheral corner portions by connecting coil pieces formed to have generally right-angle bent portions by means of punching, for example. A rectangular conductor coil has been manufactured in the conventional technique by winding an elongated rectangular conductor. For such winding, however, at least the inner peripheral corner portion of the coil inevitably has a curved shape, thus having limitations on improvements in space factor and heat dissipation performance, for example.

According to the coil manufacturing apparatus of the present embodiment, however, coil pieces can be connected together while maintaining their shapes when formed by the punching as they are. Thus, the coil manufacturing apparatus of the present embodiment can manufacture a coil capable of: having right-angle (generally right-angle) corner portions also on the inner peripheral side of the coil; improving its space factor; and improving its heat dissipation performance by the elimination of the unnecessary space.

In particular, the welded portion CP is provided not in the bent portion (corner portion) but in a linear portion. In other words, pressure welding is performed by utilizing the linear portion of the coil piece. Consequently, the form accuracy of the bent portion can be improved, and the corner portion shaped at a right angle (generally right angle) by the punching can be maintained as it is, for example.

A coil manufacturing method of the present embodiment will be described next. The coil manufacturing method of the present embodiment can be carried out in the coil manufacturing apparatus 20 described above, for example.

More specifically, the coil manufacturing method of the present embodiment is a method of forming a helical structure (coil) by connecting a plurality of rectangular conductors (coil pieces) together. In the coil manufacturing method, a plurality of strip-shaped rectangular conductors (coil pieces) capable of forming a helical structure when continuously joined together are prepared; a prepared length L0, corresponding to the total distance of the plurality of rectangular conductors (coil pieces) in the strip longitudinal direction, is set to be longer than a finished length L of a helical structure to be finally obtained (coil) in the helical longitudinal direction by a margin M; end faces of the plurality of rectangular conductors (coil pieces) are cold pressure welded together while being pressed against each other along the strip longitudinal direction and thus shortening their distances in the strip longitudinal direction; and a total shortened distance S, corresponding to an amount shortened by cold pressure welding all of the plurality of rectangular conductors (coil pieces), is set to the margin M.

Figure 9A:
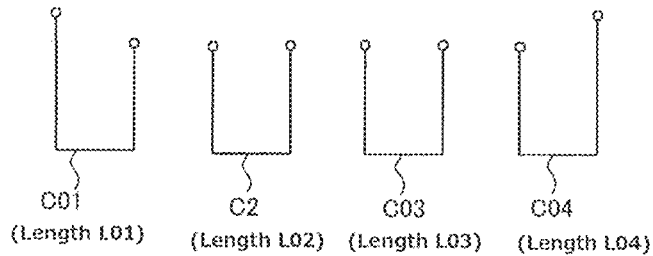
FIGS. 9A-9D include schematic diagrams for explaining a coil manufacturing method according to the present embodiment.
Figure 9B:
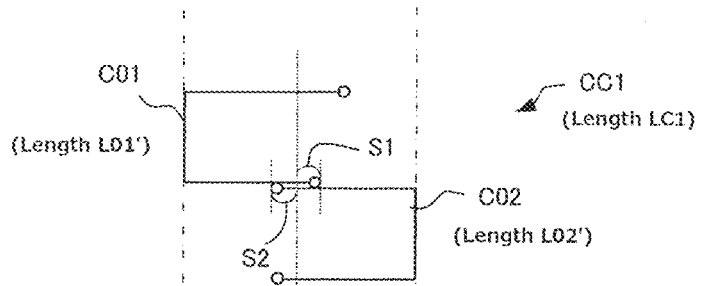
Figure 9C:
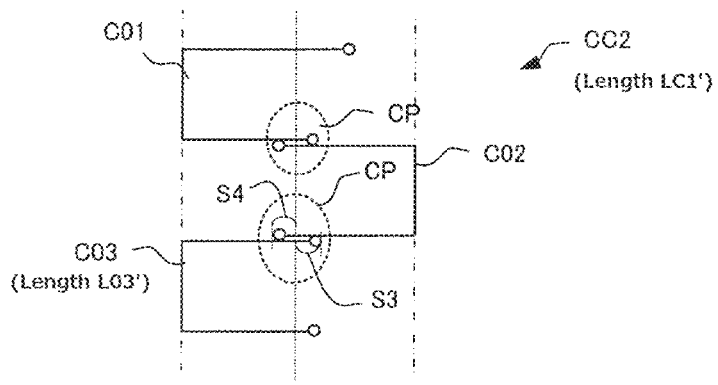
Figure 9D:
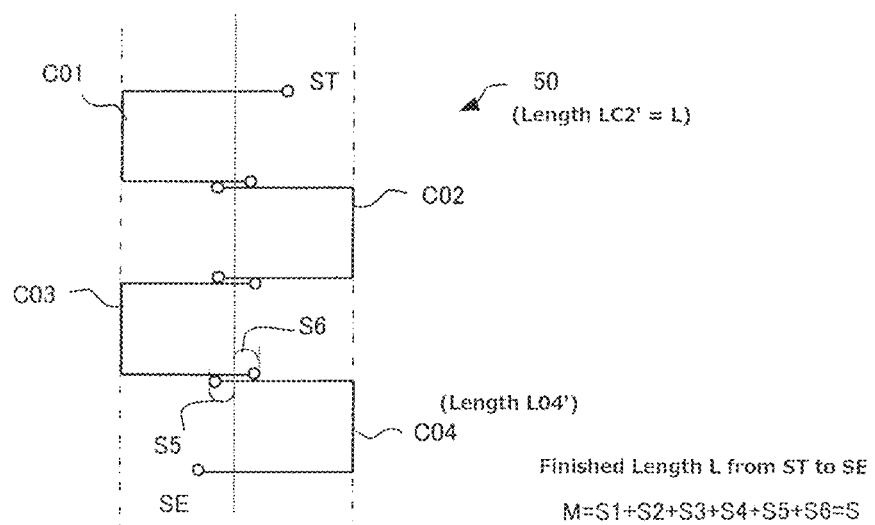

Specifically, a case where four U-shaped (Japanese katakana "ko"-shaped) unit coil pieces C0 (C01 to C04) each having two bent portions are prepared and these unit coil pieces are connected (continuously joined) together to manufacture a coil (helical structure) 50 in a helical shape of two turns will be described by way of example with reference to FIGS. 9A-9D. As with FIG. 6A-6E, FIG. 9A is a top view illustrating the coil pieces C01 to C04. FIGS. 9B to 9D are development views of connected coil pieces. A broken line in the figure indicates the axial center of the helical structure of the finally-obtained coil 50 (the center of a welded portion CP). Chain double-dashed lines at both ends of the coil pieces in FIGS. 9B to 9D indicate the finished ends of the finished coils. This example will be described assuming that no finished ends change (the positions of the finished ends do not move in the right or left direction in the figure).

If the lengths of the unit coil pieces C01 to C04 in the strip longitudinal direction are defined as L01 to L04, respectively, the prepared length L0, corresponding to their total distance in the strip longitudinal direction, equals L01+L02+L03+L04. The prepared length L0 is set to be longer than the finished length L of the coil 50 in the helical longitudinal direction by the margin M (L0=L+M). When the unit coil piece C01 and the unit coil piece C02 are cold pressure welded together by being pressed against each other along the strip longitudinal direction, the length L01 of the unit coil piece C01 in the strip longitudinal direction is compressed to L01' (the shortened (compressed) amount is a length corresponding to a distance S1 from the center of the welded portion CP) and the length L02 of the unit coil piece C02 in the strip longitudinal direction is compressed to L02' (the shortened (compressed) amount is a length corresponding to a distance S2 from the center of the welded portion CP) by the pressing. A welded coil piece CC1 (with a length LC1) is thus formed (FIG. 9B). Thereafter, when an end face of the welded coil piece CC1 (the non-welded end face of the unit coil piece C01 or C02) is cold pressure welded with the unit coil piece C03, the unit coil piece C03 is compressed to L03' (the shortened (compressed) amount is a length corresponding to a distance S3 from the center of the welded portion CP) and the welded coil piece CC1 is compressed to LC1' (the shortened (compressed) amount is a length corresponding to a distance S4 from the center of the welded portion CP) by the pressing. A welded coil piece CC2 is thus formed (FIG. 9C). When an end face of the welded coil piece CC2 (the non-welded end face of the unit coil piece C01 or C03) is further cold pressure welded with the unit coil piece C04, the unit coil piece C04 is compressed to L04' (the shortened (compressed) amount is a length corresponding to a distance S5 from the center of the welded portion CP) and the welded coil piece CC2 is compressed to LC2' (the shortened (compressed) amount is a length corresponding to a distance S6 from the center of the welded portion CP) by the pressing. The coil 50 (helical structure) with the finished length (length from a starting point ST to an end point SE) L in the helical longitudinal direction is thus formed (FIG. 9D). The sum of the shortened amounts of the coil pieces (total shortened distance S=S1+S2+S3+S4+S5+S6) before the finished coil 50 is obtained by connecting the coil pieces (unit coil pieces and/or welded coil pieces) together corresponds to the margin M.

The coil manufacturing method of the present embodiment will be described again in chronological order. First, on the basis of the length L of the coil 50 in the finished state, the lengths L01 to L04 of the unit coil pieces are set and the compressed amounts S1 to S6 caused by the cold pressure welding are set so that the total shortened distance S is equal to the margin M.

With the thus set coil pieces, end faces of the unit coil piece C01 and the unit coil piece C02 are connected together by means of the cold pressure welding while being pressed against each other by the set compressed amounts S1 and S2 to form the welded coil piece CC1. The compressed amounts S1 and S2 at this time are obtained by detecting the sliding of the unit coil piece C01 and the unit coil piece C02 when pressed against each other and thereby measuring the distances of the coil pieces in the strip longitudinal direction. Such a method of obtaining the compressed amounts can be similarly used in the following cold pressure welding.

Due to the cold pressure welding of a welding region (for example, the vicinity of the end faces of the unit coil piece C01 and the unit coil piece C02 to be welded together), a burr is generated in the welded portion by the pressing. Thus, a process of removing the burr is performed after the cold pressure welding.

Next, the coil piece (the welded coil piece CC1) is cold pressure welded with another coil piece (the unit coil piece C03) while elastically deforming and/or plastically deforming a portion of the coil piece (the welded coil piece CC1) excluding the vicinity of the end face to be cold pressure welded (the non-welded end face of the unit coil piece C01 or the unit coil piece C02) in the helical traveling direction of the helical structure to be finally obtained. The deformed amount of the elastic deformation and/or plastic deformation of the welded coil piece CC1 in the helical traveling direction is set to an amount to avoid the interference between the first holding part 11 and the second holding part 12, which hold the coil pieces during the cold pressure welding, and the welded coil piece CC1. Such a deformed amount is similarly employed in the following cold pressure welding.

Subsequently, a coil piece is similarly added. More specifically, an end face of the welded coil piece CC1 (non-welded end face of the unit coil piece C01 or C02) and the unit coil piece C03 are connected together by means of the cold pressure welding while being pressed against each other by the compressed amounts S3 and S4 to form the welded coil piece CC2. Thereafter, the burr in the welding region is removed. An end face of the welded coil piece CC2 and the unit coil piece C04 are pressed against each other by the set compressed amounts S5 and S6 so as to be connected together by the cold pressure welding while elastically deforming and/or plastically deforming a portion of the welded coil piece CC2 excluding the vicinity of the end face to be cold pressure welded in the helical traveling direction of the helical structure to be finally obtained. The finished helical structure is thus obtained.

Figure 10A:
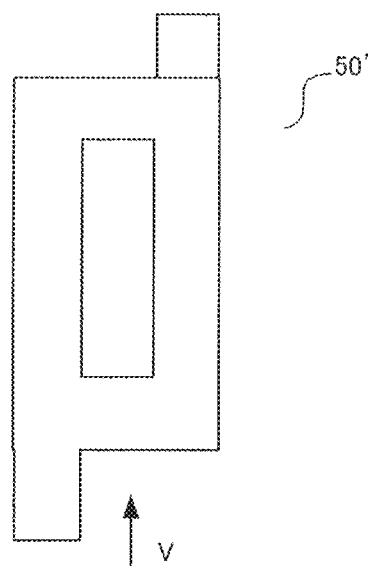
FIGS. 10A-10D include schematic diagrams for explaining the coil manufacturing method according to the present embodiment.
Figure 10B:
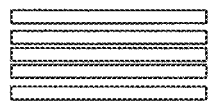
Figure 10C:
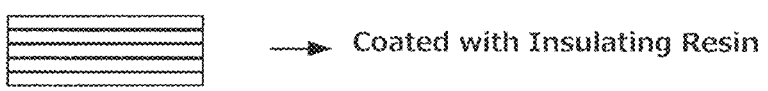
Figure 10D:

FIGS. 10A-10D is a diagram illustrating an example of a finished helical structure 50' (the number of turns in this coil is different from the above-described embodiment). FIG. 10A is a front view of the finished helical structure 50' as viewed from its helix axial direction. FIG. 10B is a view on an arrow in the V direction (side view) illustrating the finished helical structure 50' before being shaped. FIGS. 10C and 10D are side views each illustrating the finished helical structure 50' after being shaped.

The finished helical structure 50' is shaped by press working, for example. More specifically, the helical structure is elastically deformed and/or plastically deformed in the helical traveling direction in order to avoid interference with the first holding part 11 and the second holding part 12 during the cold pressure welding. Such a helical structure thus has an unnecessary and non-uniform distance (space) between adjacent helical turns. The helical structure is thus elastically deformed and/or plastically deformed in the helical traveling direction so as to compress such spaces. In this manner, the helical turns are brought closer to (brought into intimate contact with) one another as much as possible (FIG. 10C).

Furthermore, the helical structure is shaped, if necessary, to have a depressed form or a protruded form in the axial center direction of the helical structure (the radial direction of a stator core) in conformity with the shape of the stator core, i.e., shaped to have a curved form in which the inner peripheral end thereof is not coplanar with the outer peripheral end thereof as shown in FIG. 10D.

Thereafter, the shaped helical structure is dipped into a liquid insulating resin so as to be integrally coated with the insulating resin. Note that the shaped helical structure may be sprayed with a liquid insulating resin so as to be integrally coated with the insulating resin. In the conventional technique, after an elongated conductive wire with a finished coil length is coated with an insulating resin, such a conductive wire is wound to form a helical structure. In this case, however, the insulating resin is stretched in the outer peripheral region of the curved portion in such winding, resulting in reduction in the coating thickness thereof and thus leading to deterioration in the pressure resistance thereof. If the helical structure is coated with an insulating resin before the above-described shaping, for example, the coating thickness of the insulating resin varies due to the press working, thus causing a similar problem as well. According to the present embodiment, uniformity in the film thickness of the insulating resin can be improved since the helical structure shaped in a form to be attached to the stator core is integrally coated with the insulating resin after being shaped. Moreover, since the helical structure is integrally coated with the insulating resin after being shaped, the elements of the helical structure can be bonded together by the insulating resin and the film thickness can be coated with a uniform film thickness.

Figure 11A:
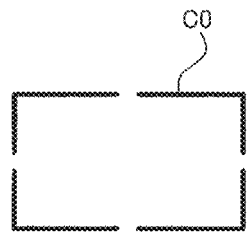
FIGS. 11A-11C show a modified example of coil pieces according to the present embodiment.
Figure 11B:
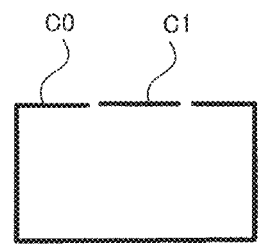
Figure 11C:
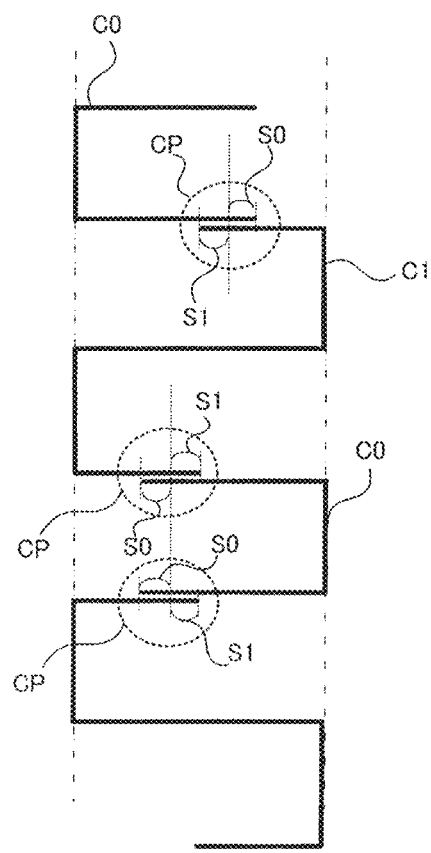

FIGS. 11A-11C is a diagram illustrating connection examples when coil pieces have different shapes.

FIG. 11A is a top view illustrating a connection example when L-shaped coil pieces are used. A case where four L-shaped coil pieces C0 are used to form a connected coil piece for one turn is illustrated here. Although the diagrammatic illustration is omitted for ease of explanation, the respective coil pieces are configured such that a prepared length L0 of these coil pieces, corresponding to their total distance in the strip longitudinal direction, is also set to be longer than a finished length L of a helical structure to be finally obtained (coil) in the helical longitudinal direction by a margin M. The margin M is set to a total shortened distance S corresponding to an amount shortened by pressing when all of the plurality of coil pieces are cold pressure welded together.

Note that the connected coil piece for one turn may not be configured by the same shape (L-shape). In other words, L-shaped, I-shaped (linear), and U-shaped (Japanese katakana "ko"-shaped) coil pieces may be combined with one another to form the connected coil piece for one turn.

FIG. 11B is a top view illustrating a connection example in which a C-shaped coil piece C0 and an I-shaped coil piece C1 are combined with each other. Although the diagrammatic illustration is omitted for ease of explanation, the respective coil pieces are configured such that a prepared length L0 of these coil pieces, corresponding to their total distance in the strip longitudinal direction, is also set to be longer than a finished length L of a helical structure to be finally obtained (coil) in the helical longitudinal direction by a margin M. The margin M is set to a total shortened distance S corresponding to an amount shortened by pressing when all of the plurality of coil pieces are cold pressure welded together.

Alternatively, a generally C-shaped coil piece having three corner portions may be combined with an L-shaped coil piece to form the connected coil piece for one turn. Furthermore, coil pieces constituting a first turn of a helical structure may have a combination different from coil pieces constituting a second turn of the helical structure.

FIG. 11C is a development view when a U-shaped (Japanese katakana "ko"-shaped) coil piece C0 having two corner portions and a coil piece for one turn of a helical structure to be finally obtained (O-shaped (Japanese katakana "ro"-shaped) coil piece) C1 are combined with each other to form a welded coil piece. Chain double-dashed lines at both ends of the coil piece in FIG. 11C indicate the finished ends of the finished coil. This example will be described assuming that no finished ends change (the positions of the finished ends do not move in the right or left direction in the figure).

The O-shaped coil piece C1 is cut in its welded portions. When one end of the U-shaped coil piece C0 and one end of the O-shaped coil piece C1 are cold pressure welded together, the U-shaped coil piece C0 is compressed by a compressed amount S0 and the O-shaped coil piece C1 is compressed by a compressed amount S1. A helical structure can be formed by repeating such a step. In FIGS. 9A-9D (when the U-shaped coil piece C0 having the same length is used), the welded portion CP is formed at substantially the same position (overlapping position) along the axial center of the helical structure in each turn of the helical structure as shown in the figure. In the case of FIG. 11C, however, the welded portion CP is formed at a position displaced by a predetermined amount along the axial center (broken line) of the helical structure in each turn of the helical structure.

Figure 12A:
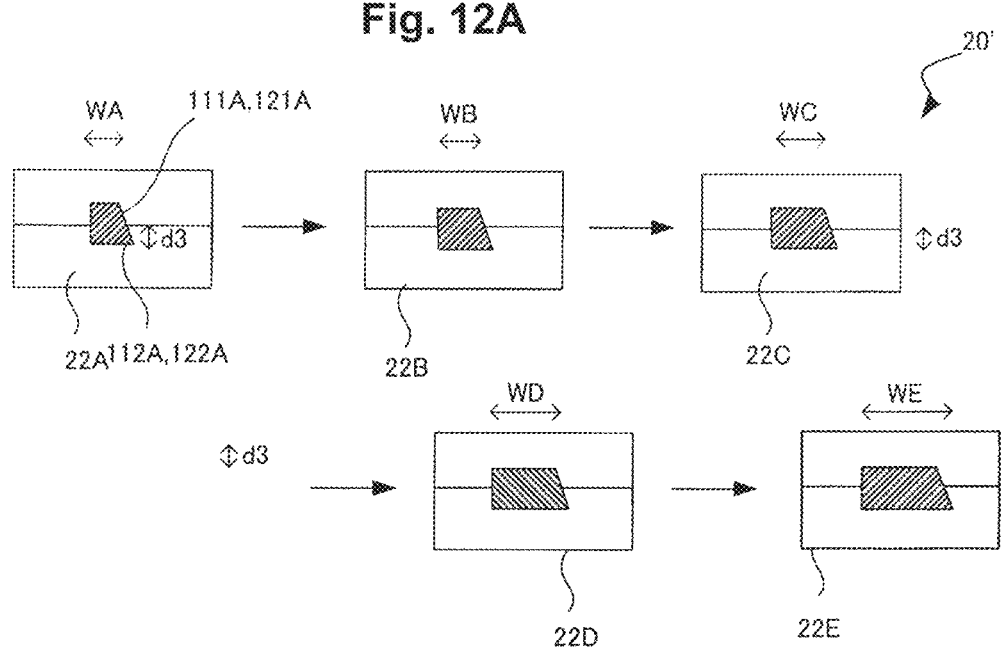
FIGS. 12A-12C include diagrams for explaining a modified example of the coil manufacturing apparatus and the coil manufacturing method according to the present embodiment.
Figure 12B:
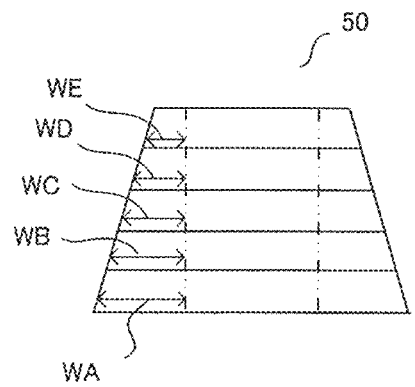
Figure 12C:
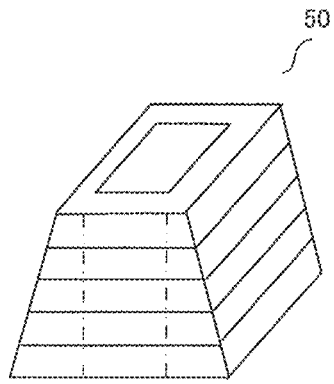

FIGS. 12A-12C includes diagrams illustrating a coil manufacturing apparatus and a coil manufacturing method according to a modified example. FIG. 12A is a schematic diagram of a coil manufacturing apparatus 20'. FIG. 12B is a side view corresponding to FIG. 10C, illustrating a coil 50 manufactured by the coil manufacturing apparatus 20'. FIG. 12C is a perspective view of the coil 50.

As shown in FIG. 12A, the coil manufacturing apparatus 20' may include a plurality of holding units 22 each configured by the above-described first holding part 11 and second holding part 12. The plurality of holding units 22 (22A to 22E) may have the first holding parts 11 and the second holding parts 12 in which widths W (widths along the Z direction; widths of rectangular conductors in a strip width direction BS) of rectangular conductor holding grooves 111A, 112A, 121A, and 122A are different from one another (sequentially increased (or decreased)).

By using the plurality of holding units 22 each having a different width W of the rectangular conductor holding grooves 111A, 112A, 121A, and 122A as described above, rectangular conductors having different widths (widths WA to WE in the figure) can be welded together. More specifically, a helical structure having coil turns with respectively different lengths can be formed by performing cold pressure welding in a different holding unit 22 for each turn of the helical structure while moving the helical structure sequentially among the plurality of holding units 22. More specifically, with the use of U-shaped (Japanese katakana "ko"-shaped) unit coil pieces having the same length in the strip longitudinal direction, the coil 50 (FIGS. 12B and 12C) having an outer shape of a truncated quadrangular pyramid can be formed by connecting the coil pieces together by the cold pressure welding while sequentially moving the coil pieces among the plurality of holding units 22.

Note that a plurality of holding units 22 each having a different depth d3 of the rectangular conductor holding grooves 111A, 112A, 121A, and 122A may be employed. In this case, the plate thicknesses of the turns of the helical structure constituting the coil 50 can be made different from one another.

Figure 13A:
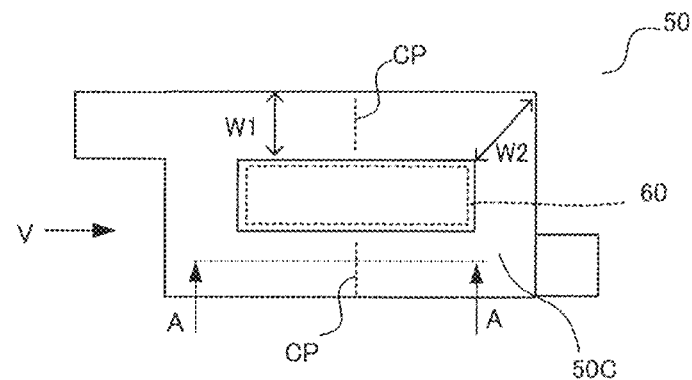
FIGS. 13A-13C include diagrams for explaining a coil according to the present embodiment.
Figure 13B:
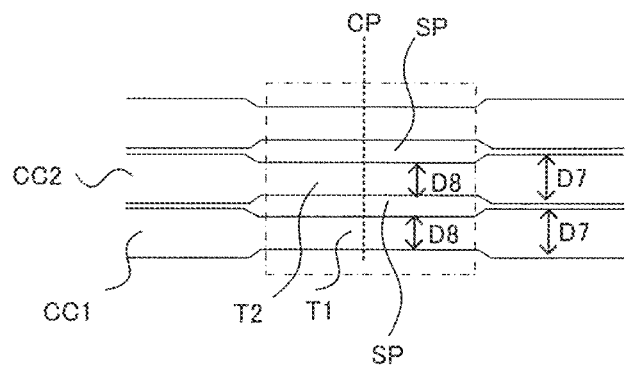
Figure 13C:

A coil of the present embodiment will be described next with reference to FIGS. 13A-13C. FIG. 13A is a front view of the coil as viewed from the axial center direction of the helical structure. FIG. 13B is a cross-sectional view taken along line A-A in FIG. 13A. FIG. 13C is a side view of FIG. 13A as viewed from the V direction.

The coil 50 of the present embodiment is a helical structure obtained by continuously joining strip-shaped rectangular conductors (coil pieces) together in a helical shape. As shown in FIG. 13A, the coil 50 includes non-curved corner portions (generally right-angle corner portions) 50C on the inner and outer peripheral sides of the helical structure. The coil 50 in this case has been manufactured with the above-described coil manufacturing apparatus and coil manufacturing method by way of example.

In a conventional coil formed by winding an elongated rectangular conductor longer than one turn of the helical structure of a finished coil, the bent portion thereof inevitably has a curved structure, thereby creating a large space when attached to a stator core. Such a void leads to an increased heat retaining property, thus placing limitations on improvement in the heat dissipation performance of the coil. If an elongated rectangular conductor is wound after being coated with an insulating resin, the coating thickness of the insulating resin is reduced in the bent portion, thus deteriorating the pressure resistance thereof.

In contrast to this, a shape for one turn of the helical structure of the coil can be formed by punching according to the coil 50 of the present embodiment. Thus, a coil having a desired form as viewed from the front can be formed. In other words, the coil 50 having a shape in conformity with the shape of the stator core and capable of being positioned closer to the stator core as much as possible (at least the inner peripheral corner portion 50C has a right-angle or generally right-angle shape) can be obtained. This can minimize the space formed between the coil 50 and a stator core 60 (indicated by a broken line in FIG. 13A) unlike the wound coil. For example, the length of the space (distance from the inner periphery of the coil 50 to the stator core 60) per one side of the coil 50 can be reduced to 0.5 mm to 1.0 mm. This can improve the heat dissipation performance. Moreover, since the insulating resin can coat the entire coil 50 with increased uniformity, deterioration in pressure resistance due to variations in the film thickness of the insulating resin can be prevented from occurring.

Moreover, in the coil 50 of the present embodiment, a width perpendicular to the helical traveling direction of the helical structure (a width W1 of the coil piece in the strip width direction) changes to a broadened width W2 in the corner portion. This can also reduce coil resistance.

Furthermore, the cold pressure welding is atomic binding between metals. Thus, the connected portions thereof are welded together reliably to an invisible level. Thus, the stability of the connected portions can be enhanced significantly as compared to a configuration in which flat surfaces of coils for one turn (or less) are connected together with an adhesive material (for example, with a fixing material or by brazing).

As shown in FIG. 13B, part of the first helical turn of the helical structure (for example, the first turn by a welded coil piece CC1) is provided with a first thin portion T1 having a plate thickness D8 thinner than a plate thickness D7 of the other part of the rectangular conductor (coil piece). Also, part of the second turn (for example, the second turn by a welded coil piece CC2) continuous with the first turn is provided with a second thin portion T2 having the plate thickness D8 thinner than the plate thickness D7 of the other part of the rectangular conductor (coil piece).

As mentioned above, coil pieces are sandwiched by the first holding part 11 and the second holding part 12 of the coil manufacturing apparatus 20 during the cold pressure welding thereof. At this time, the total depth of the rectangular conductor holding grooves 111A and 112A (the same applies to the total depth of the rectangular conductor holding grooves 121A and 122A) is smaller than the plate thickness D7 of the coil piece. When the coil pieces are sandwiched by the first holding part 11 and the second holding part 12 while being pressed by the pressing parts 18, the sandwiched portions are compressed in the plate thickness direction so as to have the thickness (D8) approximately the same as the total depth of the rectangular conductor holding grooves 111A, 112A, 121A and 122A. The portions sandwiched by the first holding part 11 and the second holding part 12 correspond to the first thin portion T1 and the second thin portion T2. In other words, the first thin portion T1 and the second thin portion T2 are formed corresponding to the welded portions CP in the cold pressure welding. In the case of a coil formed by connecting U-shaped (Japanese katakana "ko"-shaped) coil pieces together, for example, the first thin portion T1 is provided at two positions in the first turn, and the second thin portion T2 is provided at two positions in the second turn. When U-shaped unit coil pieces all have the same length, the first thin portion T1 and the second thin portion T2 are provided at overlapping positions in the axial center direction of the helical structure as indicated by a broken-line rectangle.

When a U-shaped (Japanese katakana "ko"-shaped) coil piece and an O-shaped (Japanese katakana "ro"-shaped) coil piece are combined as shown in FIG. 11, the first thin portion T1 and the second thin portion T2, which are formed corresponding to the welded portions CP in the cold pressure welding, are formed at positions displaced in opposite directions in the first turn and the second turn so as to correspond to the welded portions CP (for the O-shaped coil piece, only one thin portion is formed per one turn).

All turns of the coil 50, together constituting the helical structure, are integrally coated with an insulating resin. This can enhance the degree of adhesion among the turns of the helical structure. Although a gap SP of the coil piece is formed between the first thin portion T1 and the second thin portion T2, part of the insulating resin is embedded also in the gap SP. In other words, the insulating resin enters into the gap SP since the helical structure is dipped into the liquid insulating resin after being finished (and after being shaped if necessary) as described in the above-described manufacturing method. This can further enhance the degree of adhesion among the turns of the helical structure.

In conformity with the shape of the stator core 60, the coil 50 may be shaped to have a depressed form or a protruded form in the axial center direction of the helical structure (the radial direction of the stator core), i.e., shaped to have a curved form in which the inner peripheral end thereof is not coplanar with the outer peripheral end thereof as shown in FIG. 13C.

Figure 14:
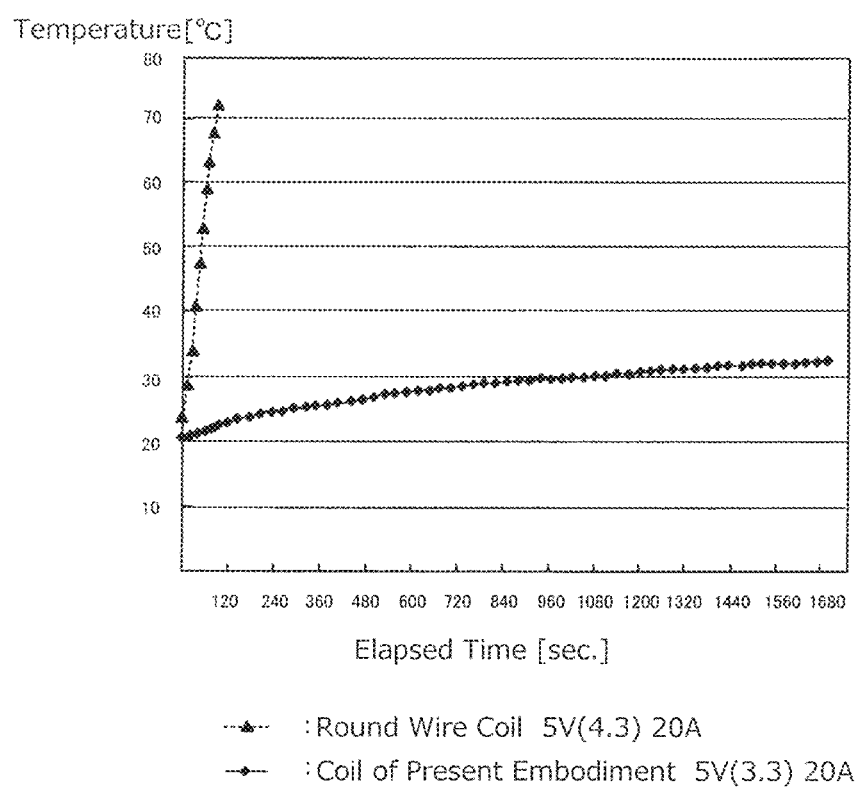
FIG. 14 is a graph showing experimental results about heating values of the coil according to the present embodiment and a coil according to a conventional example.

FIG. 14 is a graph comparing the coil 50 of the present embodiment with a coil formed by winding a round wire (round wire coil) for the measured heating values thereof. The heating values (temperatures) of the round wire coil and the coil 50 of the present embodiment were measured over time at 5 V and 20 A.

The temperature of the round wire coil rose sharply to 28.5° C. in the first 10 seconds and to 42° C. in the first 30 seconds. Since the temperature rose to 73° C. in 90 seconds from the start, the experiment was ceased. The temperature of the coil 50 (20 A) of the present embodiment, on the other hand, rose gently to 21.1° C. in the first 10 seconds and to 21.5° C. in the first 30 seconds. The temperature reached saturation at 32.4° C. after a lapse of 1,530 seconds from the start.

As is apparent from this result, it can be said that the temperature of the coil of the present embodiment (coil in which the inner peripheral side thereof has a generally right-angle shape (coil with the right-angle inner periphery)) 50 hardly rises above a temperature close to the ordinary temperature (for example, 40° C. to 50° C.) even during the operation thereof. Thus, it can be said that the coil 50 of the present embodiment has significantly high heat dissipation performance. Such high heat dissipation performance can significantly reduce coil resistance as compared to the conventional coil.

A width of the starting edge and end edge of the helical structure of the coil 50 may be set larger than the width W1 of the coil 50 in the strip width direction. This can reduce coil resistance at the starting edge and the end edge as with the corner portions.

The coil 50 having the right-angle inner periphery, which is formed by repeatedly welding end faces of coil pieces together by means of cold pressure welding, has been described in the present embodiment. However, the present invention is not limited thereto. For example, the end faces of the coil pieces may be welded according to another welding method. Specific examples may include various connection methods such as ultrasonic welding (high-frequency welding), electric welding, and brazing.

Figure 15A:
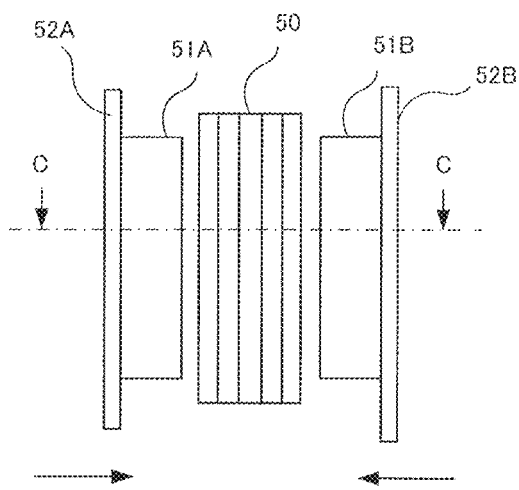
FIGS. 15A-15C include diagrams for explaining a method of attaching the coil according to the present embodiment to a stator core.
Figure 15B:
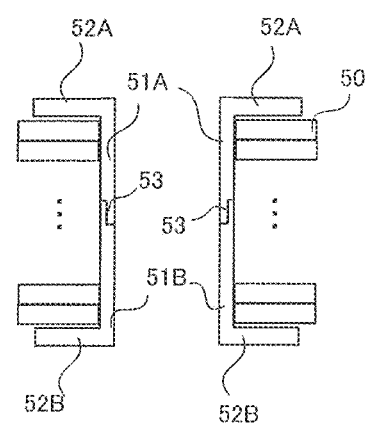
Figure 15C:
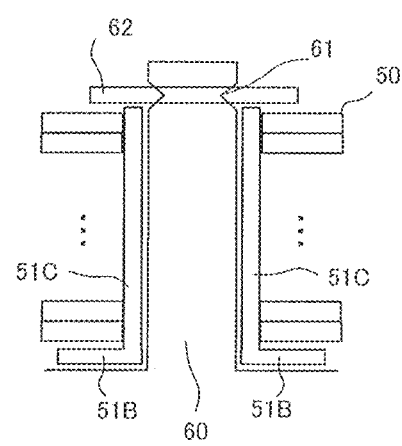

With reference to FIGS. 15A-15C, an attachment example of the coil 50 of the present embodiment to a stator core will be described. FIG. 15A is a side view of the coil 50 and cassettes 51A and 51B. FIG. 15B is a cross-sectional view taken along line C-C in FIG. 15A. FIG. 15C is illustrating an attachment example to the stator core 60, corresponding to the cross section of line C-C in FIG. 15A.

The coil 50 of the present embodiment is formed by being shaped in conformity with the outer shape of the stator core as shown in FIG. 13C and then being integrally coated with the insulating resin. The thus obtained coil 50 is attached to the stator core afterward.

For this reason, the two cassettes 51A and 51B having flanges 52A and 52B on one side in the axial center direction of the helical structure of the coil 50, for example, are prepared as shown in FIG. 15A. The coil 50 is introduced from the side of one cassette 51A where no flange 52A is formed. Thereafter, the other cassette 51B is placed over the cassette 51A and these cassettes are engaged with each other. The thus obtained coil 50 having the cassettes is inserted into the stator core 60. Notches or engagement parts 53 to be fitted together are provided in the cassettes 51A and 51B as shown in FIG. 15B.

The coil 50 may be attached to one cassette 51C having a flange 51B only on one side in the axial center direction of the helical structure and then installed in the stator core 60 as shown in FIG. 15C. In such a case, the stator core 60 may be provided with a notch 61, and a retaining ring 62 for covering a portion above the coil 50 having the cassette and the notch 61 of the stator core 60 may be fitted together after the coil 50 having the cassette is attached to the stator core 60 in order to prevent the coil 50 from coming off from the stator core 60 (or from causing unnecessary movement (vibration)) due to centrifugal force during its operation.

Figure 17A:
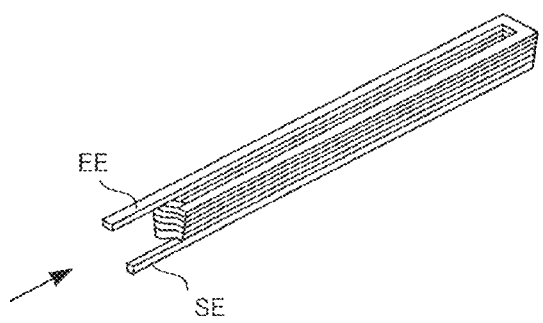
FIGS. 17A-17D include diagrams illustrating a helical structure of the coil according to the present embodiment.
Figure 17B:
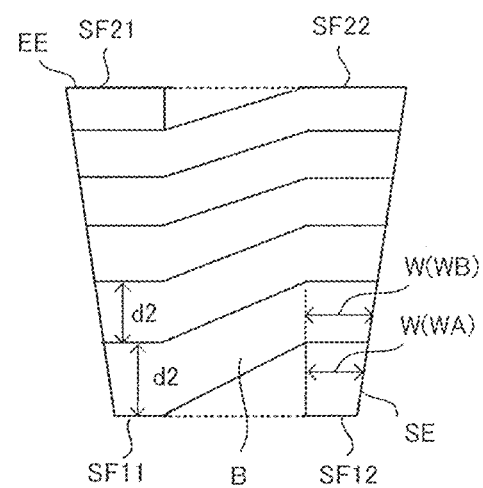
Figure 17C:
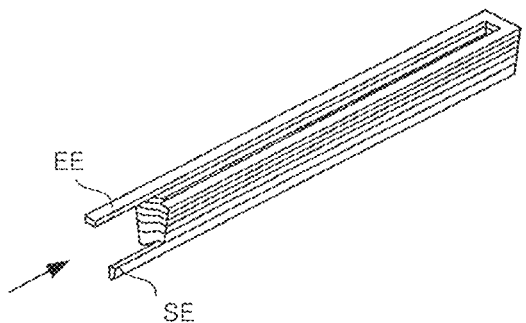
Figure 17D:
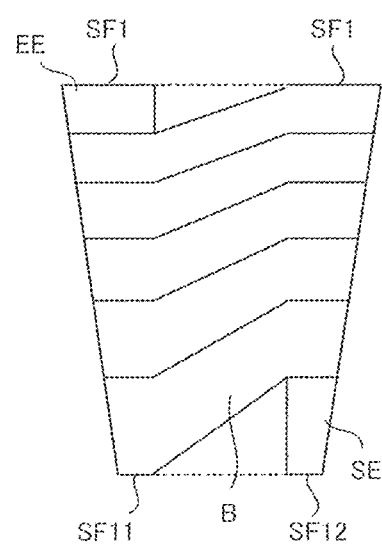

The helical structure of the coil will be further described with reference to FIGS. 16A-16E and 17A-17D. FIGS. 16A-16E include side views illustrating the coil 50 of the present embodiment. FIG. 16A is a side view of the coil 50 as viewed from its shorter side, and FIG. 16B is a side view of the coil 50 as viewed from its longer side according to one example. FIG. 16C is a side view of the coil 50 as viewed from its shorter side, and FIG. 16D is a side view of the coil 50 as viewed from its longer side according to another example. FIG. 16E is a side view of the coil 50 as viewed from its shorter side according to still another example. FIGS. 17A-17D show a modified example of FIGS. 16C and 16E. FIGS. 17A and 17 C are external perspective views. FIGS. 17B and 17D are side views on arrows in FIGS. 17A and 17C, respectively.

When a plurality of U-shaped (Japanese katakana "ko"-shaped) unit coil pieces shown in FIGS. 6A-6E are connected together to form a helical structure, for example, the unit coil piece is gradually deformed along the helical traveling direction for one turn from the first helical turn TC1 to the second helical turn TC2 so as to absorb the thickness of the unit coil piece as shown in FIGS. 16A and 16B. Such a step is repeated for each turn.

More specifically and strictly speaking, for the coil 50 according to one example of the present embodiment, each coil piece is connected to the next coil piece while being slightly tilted to form the helical structure as shown in FIGS. 16A and 16B. Although a shorter-side side surface (FIG. 16A) and a longer-side side surface (FIG. 16B) of the coil 50 are illustrated here, all of the four side surfaces of the coil 50 are tilted similarly.

The coil 50 of the present embodiment is not limited to the above-described structure. Helical structures as shown in FIGS. 16C to 16E may be employed.

More specifically, part of the first helical turn TC1 of the helical structure is deformed to create a level difference B corresponding to the thickness of the coil piece along the helical traveling direction and part of the second helical turn TC2 is deformed to have the level difference B corresponding to the thickness of the coil piece along the helical traveling direction as shown in FIG. 16C. Such a step is repeated to form a helical structure. An area where the level differences B are created is present only on one side surface (for example, one of the shorter-side side surfaces) of the coil 50. The level differences B are created in the same area, i.e., the level difference B in the second turn is created on the level difference B in the first turn.

The thickness of the coil piece is absorbed by the level difference B created only on one side surface as described above. Thus, as shown in the longer-side side view in FIG. 16D, the coil pieces are layered generally horizontally without being tilted for the other three side surfaces.

Such a configuration can make the outermost peripheral surfaces of the coil flat without a starting edge SE and an end edge EE of the coil 50 being projected. More specifically, in the helical structure shown in FIGS. 16A and 16B, a surface (the lower end face in the figure) of the coil 50 including the starting edge SE is not coplanar with a coil surface SF11' formed by making a loop from a coil surface SF12' of the starting edge SE and positioned on a side opposite to the coil surface SF12', creating a level difference therebetween as shown in FIG. 16A. Similarly, a surface (the upper end face in the figure) of the coil 50 including the end edge EE is not coplanar with a coil surface SF22' positioned on a side opposite to a coil surface SF21' of the end edge EE, creating a level difference therebetween. Such level differences cause no significant problem when the thickness of the coil piece is relatively thin. When the coil piece has a large thickness, however, spaces corresponding to such level differences need to be provided when the coil is set to the cassettes 51A and 51B as shown in FIGS. 15A-15C. Additionally, the thus created gaps may cause a problem such as the backlash of the coil 50.

In contrast to this, a surface (the lower end face in the figure) of the coil 50 including the starting edge SE is provided (generally) coplanar with a coil surface SF11 formed by making a loop from a coil surface SF12 of the starting edge SE and positioned on a side opposite to the coil surface SF12, and a surface (the upper end face in the figure) of the coil 50 including the end edge EE is provided (generally) coplanar with a coil surface SF22 positioned on a side opposite to a coil surface SF21 of the end edge EE according to the helical structure shown in FIGS. 16C and 16D. This can reduce the size of the outer shape of the coil 50 and can enhance the degree of adhesion to the cassettes 51A and 51B.

FIG. 16E shows another example having a helical structure similar to that shown in FIGS. 16C and 16D but having a different coil piece shape. The coil piece has a (generally) square cross section having a width W in the strip width direction BS and a thickness d2 approximately equal to each other as shown in FIG. 16E. When the thickness d2 is large relative to the width W as in this example, it is more preferred to employ the helical structure in which the level differences B are provided on one side surface of the coil 50 as shown in FIG. 16E.

FIGS. 17A-17D include diagrams illustrating another example of the present embodiment. As shown in FIG. 17B, all of the coil pieces constituting the coil 50 (all of the coil pieces connected together along the helical traveling direction) may each have a different width W in the strip width direction BS and a different thickness d2. For example, in the coil 50 shown in FIG. 17B, coil pieces, each having a gradually increased width W (WA, WB . . . ) and a gradually decreased thickness d2 from a starting edge SE toward an end edge EE, are connected together.

Note that only the widths W of coil pieces may vary (change) or only the thicknesses d2 of coil pieces may vary (change) without being limited to the above-described example.

With such a configuration, the coil 50 in a shape of a desired truncated quadrangular pyramid can be manufactured. If the helical structure as shown in FIG. 16A is employed especially with a plurality of coil pieces having different thicknesses d2 as in this example, a difference between the thicknesses d2 of the coil pieces in the starting edge SE and the end edge EE causes a difference between the level difference values of the outermost peripheral (upper outermost peripheral and lower outermost peripheral in the figure) coil surfaces. This increases the size of the outer shape of the coil 50 and makes the shape of the coil 50 non-uniform (asymmetric). Therefore, an extra space further needs to be provided in the cassettes 51A and 51B. Additionally, this leads to an increased possibility of making the reliable attachment of the coil 50 to the cassettes 51A and 51B difficult to achieve. If the helical structure in which the level differences B are created on one side surface of the coil 50 is employed in such a case, the outermost peripheral coil surfaces can be made (generally) flat (coil surfaces SF11 and SF12 can be made coplanar with each other and coil surfaces SF21 and SF22 can be made coplanar with each other) even when the thicknesses d2 of the coil pieces vary. Thus, a significant size reduction in the outer shape of the coil 50 can be achieved and the trouble when the coil 50 is attached to the cassettes 51A and 51B can be prevented from occurring.

Although the case where the level differences B are provided on a shorter-side side surface of the coil 50 has been described by way of example in the above-described example, the level differences B may be provided on a longer-side side surface of the coil 50. The positions where the level differences B are provided can be appropriately selected depending on the shapes of the drawn starting edge SE and end edge EE.

The present invention can be configured by various embodiments without being limited to the above-described embodiment. For example, the bent portion of a coil piece may have a curved shape.

One of the coil piece is not limited to a coil piece formed by punching a copper plate. One of the coil piece may be formed by arranging a plurality of thin rectangular conductors (for example, rectangular conductors each having a square cross section in the strip longitudinal direction as shown in FIG. 16E) in parallel. Alternatively, a coil may be configured partially by a coil piece formed by punching a copper plate and partially by a coil piece formed by arranging thin rectangular conductors in parallel.

The present invention can be employed, for example, when a coil apparatus using a rectangular coil is manufactured.

REFERENCE SIGNS LIST

10 cold pressure welding apparatus
20 coil manufacturing apparatus
11 first holding part
12 second holding part
50 coil

The invention claimed is:

1. A coil manufacturing apparatus for forming a helical structure by connecting together a plurality of strip-shaped flat conductors capable of having a helical shape when continuously joined together, the coil manufacturing apparatus comprising:
 a first holding part and a second holding part capable of sandwiching one of the flat conductors and a different one of the flat conductors, respectively, and disposed opposite to each other; and a drive part; wherein:

the first holding part includes a first upper holder and a first lower holder which are capable of sandwiching the one flat conductor;

the second holding part includes a second upper holder and a second lower holder which are capable of sandwiching the different one of the flat conductors;

the drive part is capable of moving the first holding part and the second holding part along a first direction;

the drive part is capable of moving the first upper holder and the first lower holder along a second direction, and is capable of moving the second upper holder and the second lower holder along the second direction;

a connected flat conductor to be the helical structure can be formed in a helical below the first lower holder and the second lower holder by pressing end faces of the one flat conductor and the different flat conductor by operating the drive part;

an accommodating portion for the connected flat conductor formed in a helical is provided below the first lower holder and the second lower holder, and the accommodating portion is a space in which the connected flat conductor formed in a helical can be accommodated without interfering with either the first holding part and the second holding part.

2. The coil manufacturing apparatus of claim 1, wherein the space is capable of accommodating an anterior finished portion of the connected flat conductor.

3. The coil manufacturing apparatus of claim 1, further comprising a removal part configured to remove a burr that projects in a direction crossing a strip longitudinal direction and a strip width direction of the connected flat conductor.

* * * * *